United States Patent [19]

Carriere

[11] Patent Number: 5,125,284

[45] Date of Patent: Jun. 30, 1992

[54] POWERTRAIN ASSEMBLY WITH A CROSS-AXIS DISPOSITION OF THE ENGINE CRANKSHAFT AND THE TRANSMISSION TORQUE INPUT SHAFT

[75] Inventor: Donald L. Carriere, Livonia, Mich.

[73] Assignee: Ford Motor Company, Dearborn, Mich.

[21] Appl. No.: 471,759

[22] Filed: Jan. 29, 1990

[51] Int. Cl.⁵ .............................................. F16H 1/14
[52] U.S. Cl. .................................... 74/424; 74/15.63;
    74/417; 475/198
[58] Field of Search ............... 475/200, 198, 205, 201,
    475/206; 74/416, 417, 424, 15.63, 730.1

[56] References Cited

U.S. PATENT DOCUMENTS

| | | | |
|---|---|---|---|
| 706,978 | 8/1902 | Marks | 180/297 |
| 764,893 | 7/1904 | Jones et al. | 123/41.65 |
| 1,653,856 | 12/1927 | Kane | 74/596 |
| 1,991,575 | 1/1935 | Reese | 180/70 |
| 2,256,601 | 9/1941 | West | 74/15.63 |
| 3,027,960 | 4/1962 | Ditel | 180/44 |
| 4,056,988 | 11/1977 | Kubo et al. | 74/695 |
| 4,240,256 | 12/1980 | McDougal | 74/417 |
| 4,323,352 | 4/1982 | Warren et al. | 74/417 |
| 4,368,649 | 1/1983 | Vahratian et al. | 74/695 |
| 4,509,389 | 4/1985 | Vahratian et al. | 74/695 |
| 4,572,318 | 2/1986 | Cady | 475/201 |
| 4,607,538 | 8/1986 | Geisthoff | 74/416 |
| 4,607,541 | 8/1986 | Miura et al. | 74/758 |
| 4,643,045 | 2/1987 | Katayama | 475/198 |
| 4,700,800 | 10/1987 | Friedrich et al. | 475/206 |
| 4,939,945 | 7/1990 | Ryder et al. | 74/417 |

FOREIGN PATENT DOCUMENTS

| | | |
|---|---|---|
| 654326 | 3/1934 | |
| 762655 | 5/1943 | Fed. Rep. of Germany . |
| 933078 | 6/1948 | France . |
| 2092533 | 8/1982 | United Kingdom . |
| 8500509 | 4/1986 | ld Int. Prop. O. . |
| 56-20861 | 7/1981 | Japan . |

OTHER PUBLICATIONS

"Auto Notizie", Cizeta Moroder Company of Italy, May 1989.

Primary Examiner—Rodney H. Bonck
Assistant Examiner—Ryan W. Massey
Attorney, Agent, or Firm—Frank G. McKenzie; Roger L. May

[57] ABSTRACT

A T-drive powertrain for an automobile having an internal combustion engine mounted in a vehicle engine compartment with its crankshaft axis disposed transversely with respect to the vehicle geometric center plane and a power transmission mechanism having its principal gearing axis disposed in a fore-and-aft direction generally on the vehicle geometric center plane; the driving connection between the engine and the transmission gearing including a direct-drive, cross-axis gear assembly with a driving gear carried by the engine crankshaft at a location on the crankshaft near a midpoint between the crankshaft ends.

44 Claims, 14 Drawing Sheets

| Gear | C11 | C12 | C13 | C14 | B1 | B2 | Drive OWC1 | Drive OWC2 | Coast OWC1 | Coast OWC2 | Ratio |
|---|---|---|---|---|---|---|---|---|---|---|---|
| 1M | X | X | | | | | X | | | X | 2.779 |
| 1D | X | X | X | | | | X | O/R | O/R | | 2.779 |
| 2 | X | X | X | | | X | O/R | X | O/R | | 1.512 |
| 3 | X | | X | | X | | | X | X | | 1.000 |
| 4 | X | | X | | | | O/R | O/R | | | .712 |
| R | X | | X | X | | | X | | | O/R | 2.474 |

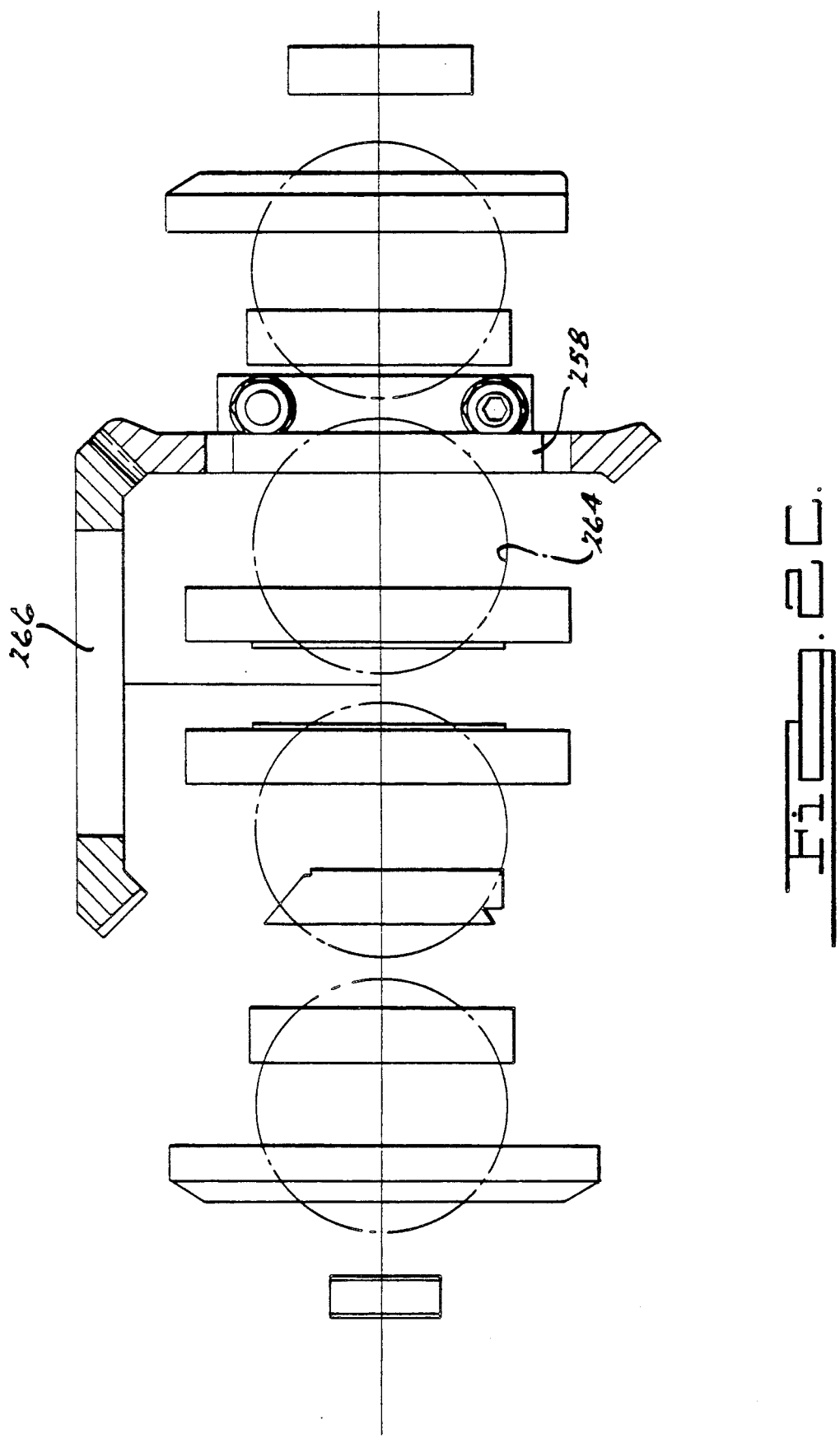

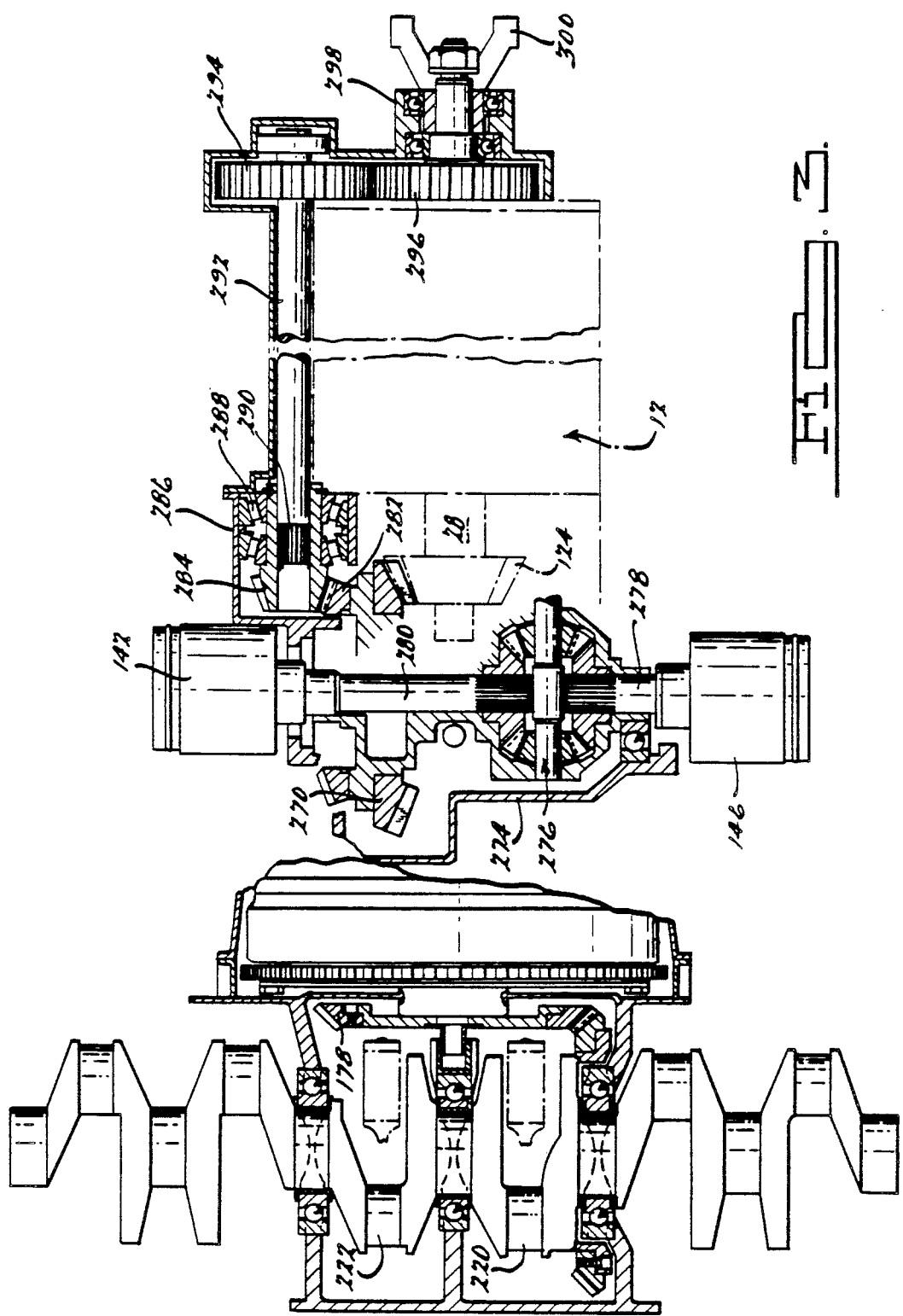

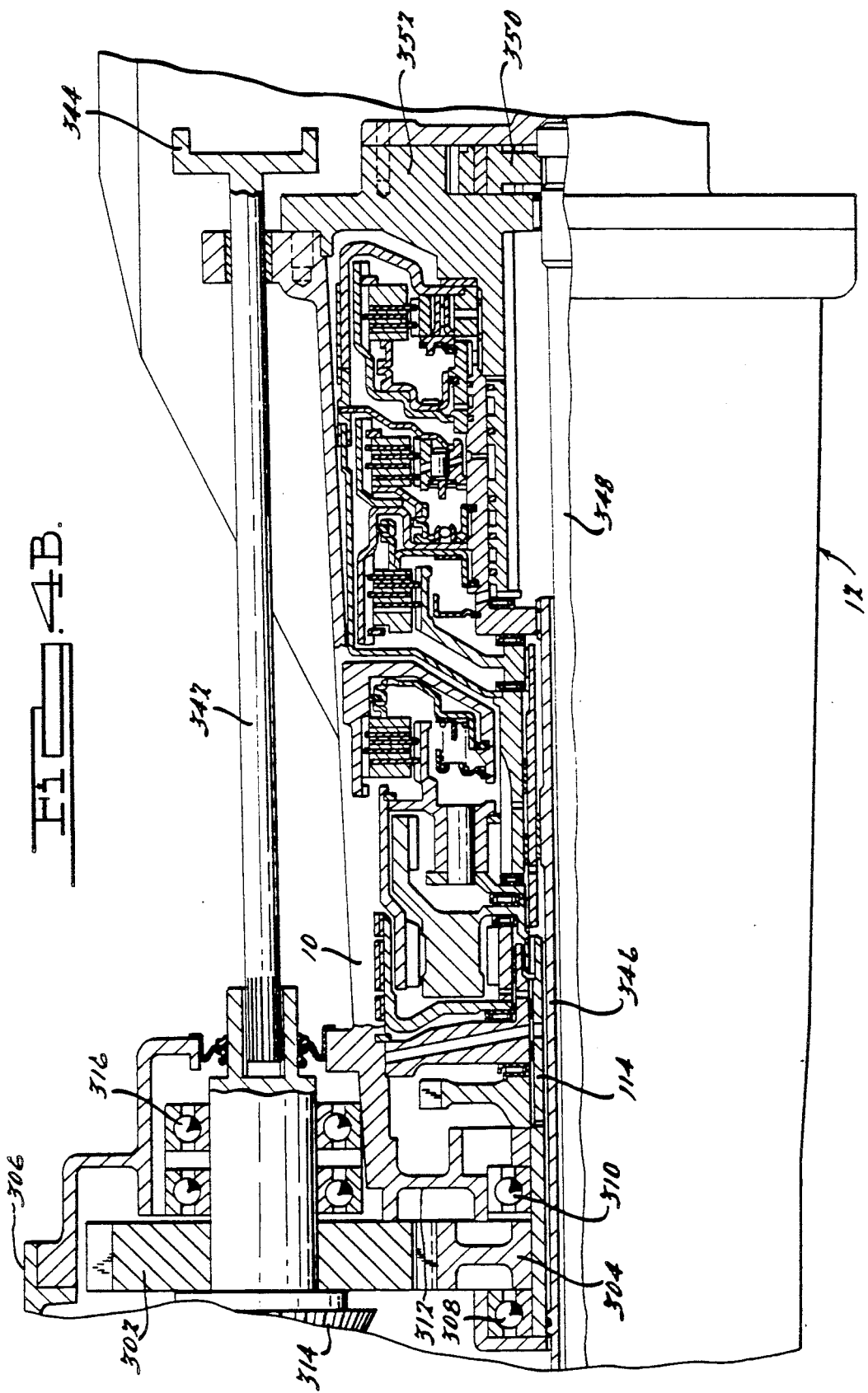

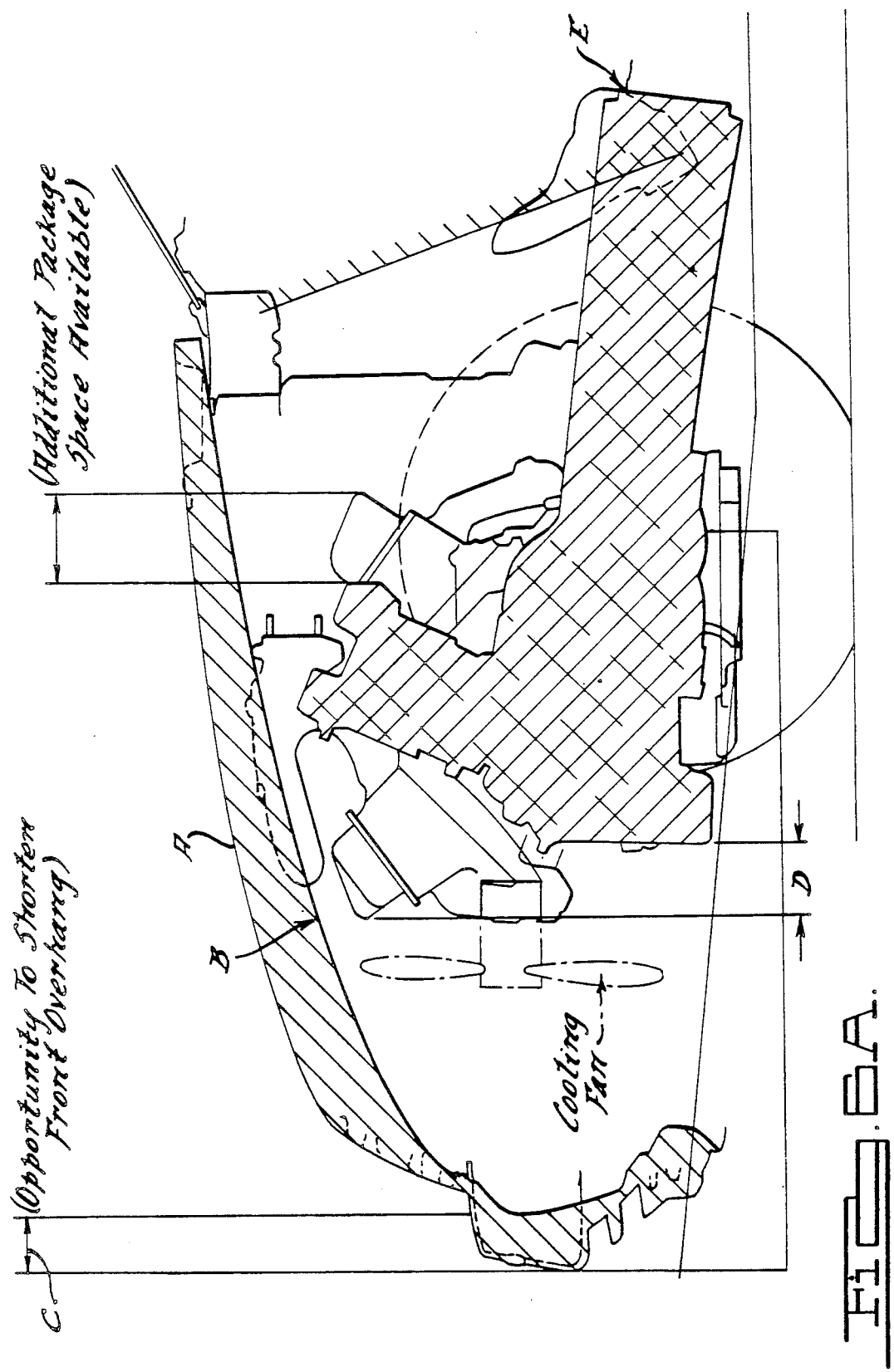

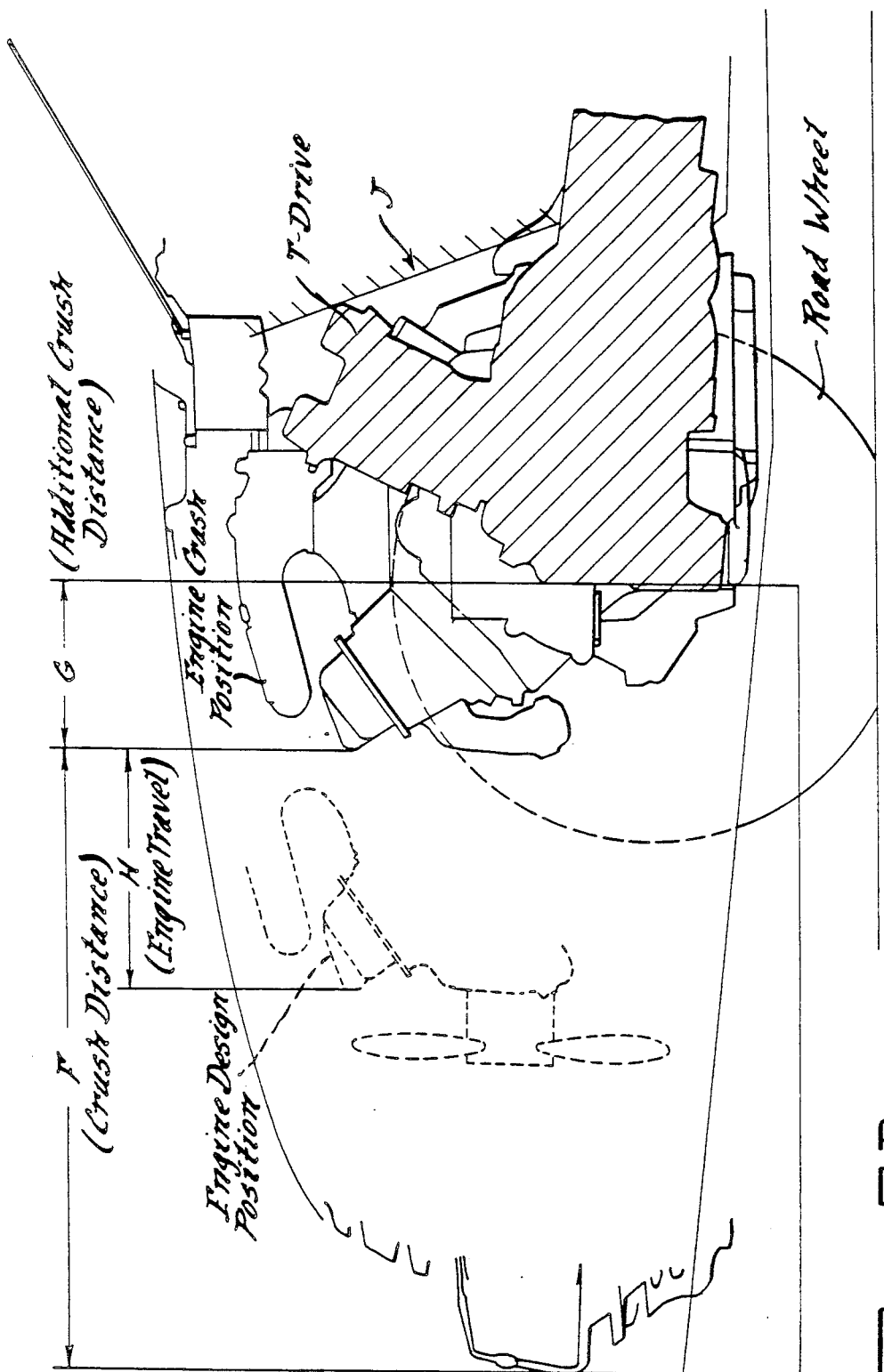

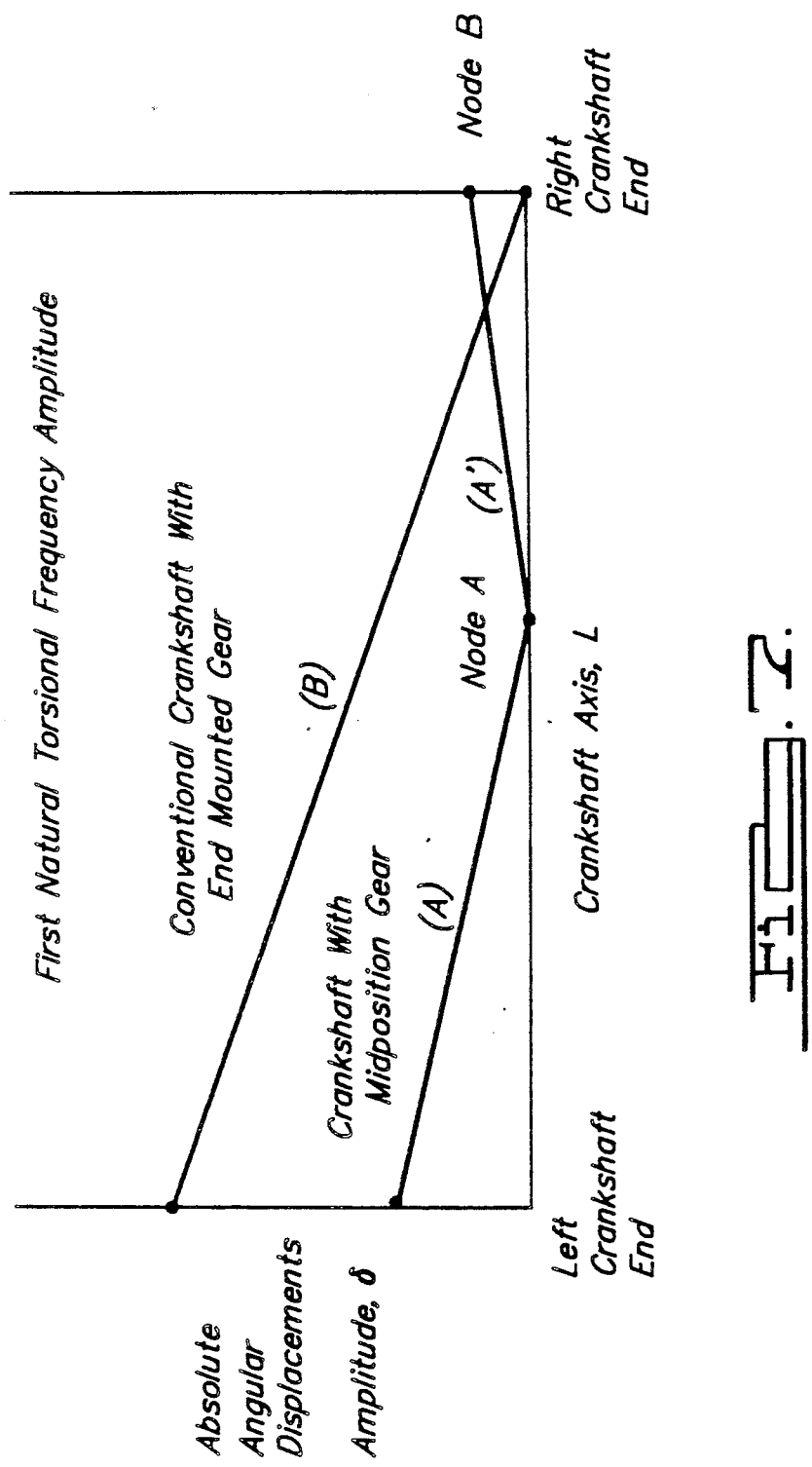

POWERTRAIN ASSEMBLY WITH A CROSS-AXIS DISPOSITION OF THE ENGINE CRANKSHAFT AND THE TRANSMISSION TORQUE INPUT SHAFT

TECHNICAL FIELD

My invention relates to powertrains for automotive vehicles having an internal combustion engine and a multiple ratio power transmission mechanism wherein the engine crankshaft axis and the transmission gearing axis are arranged in a "T" configuration.

BACKGROUND ART

My invention comprises improvements in powertrains for automotive vehicles, particularly automotive vehicles with unitary engine and transmission assemblies.

In the case of front-wheel drive vehicles, it is common practice to mount an internal combustion engine in transverse disposition with respect to the fore-and-aft center axis of the vehicle within a forward engine and transmission compartment. Multiple ratio planetary gearing is used to deliver torque from the engine to axle half-shafts disposed in generally parallel disposition with respect to the engine axis. An example of an arrangement of this kind is the transaxle assembly disclosed in U.S. Pat. No. 4,509,389, which is assigned to the assignee of my invention.

The transaxle assembly of the '389 patent is adapted to be used with an internal combustion engine mounted in a so-called transverse or "east-west" direction within an engine compartment for a front-wheel drive vehicle. The transaxle includes a hydrokinetic torque converter mounted concentrically with respect to the axis of the engine crankshaft. The turbine of the hydrokinetic torque converter is connected to a torque input shaft for a multiple ratio planetary gear assembly arranged on an axis that is spaced from and parallel to the turbine shaft axis. A torque transfer drive comprising a chain-and-sprocket assembly is adapted to transfer torque from the turbine shaft to the input shaft of a multiple ratio gear system. Fluid pressure operated clutch and brake assemblies are used to establish selectively the various ratios in the gear system to permit adequate torque ratio coverage for the powertrain. A final drive assembly located on the torque output side of the gearing multiplies the output torque of the planetary gearing and delivers it to a differential carrier, the side gears of the carrier being connected to axle half-shafts through universal joints.

An example of a transaxle having a transverse engine is shown in U.S. Pat. No. 4,368,649, which also is assigned to the assignee of this invention.

Arrangements of this kind are referred to in the automotive industry as so-called "U-drives". They usually are found in front-wheel drive vehicles with transversely mounted engines, but they may be adapted also for various other powertrain arrangements for vehicles presently used in the automotive industry. The torque delivered from the transaxle differential assembly in an arrangement of this kind may be transferred to a torque output shaft concentrically disposed within the planetary gearing. The output shaft extends in a transverse direction to the torque input ends of each of the two axle half-shafts for the traction wheels.

Another example of a prior art transaxle and engine assembly is shown in U.S. Pat. No. 4,607,541 wherein the hydrokinetic torque converter is disposed concentrically with respect to the multiple ratio planetary gearing on the axis of the crankshaft of the internal combustion engine. As in the case of the arrangement of the '389 patent, the torque output from the planetary gearing is delivered to a driven shaft coaxially disposed with respect to the planetary gearing. A final drive assembly located between the torque converter and the planetary gearing is adapted to deliver torque to the carrier of a differential assembly. Axle shafts are connected to the side gears of the differential assembly, but these half-shafts are in spaced, parallel disposition with respect to the planetary gearing. This is in contrast to the arrangement of the '389 patent where the axle shafts are coaxially disposed with respect to the planetary gearing.

An example of an engine and transaxle assembly wherein driving axle half-shafts are disposed perpendicularly with respect to the axis of the engine crankshaft is shown in U.S. Pat. No. 4,056,988. In this case, a differential gear assembly has its side gears disposed perpendicularly with respect to the axis of the planetary gearing, the latter being spaced from and parallel to the axis of the engine crankshaft.

Engine and transaxle assemblies of the kind described in the preceding paragraphs require a relatively large engine and transaxle compartment in the vehicle. This restricts the ability of the automotive designer to develop an optimum profile for improved aerodynamics and for reduced vehicle weight. To minimize the space required for the engine and transaxle, and thus increase the space dedicated to the passengers and cargo, attempts have been made to arrange the engine and the transmission gearing with the axis of the engine crankshaft generally perpendicular to the axis of the gearing in a T-drive configuration without a significant offset between the axes. This requires a direct driving connection between the engine crankshaft and the torque input drive for the multiple ratio gearing. An example of an attempt to develop such a configuration is described in an automotive publication entitled "Auto Notizie", published by the Cizeta Moroder Company of Italy, in May 1989. That publication describes a V-16 engine with two independent crankshafts arranged end-to-end. The adjacent ends of the crankshafts are connected to a drive gear, and engine crankshaft torque is delivered through an idler to a bevel gear which serves as a torque input shaft for a multiple ratio transmission having an axis disposed perpendicularly with respect to the crankshaft axis.

Another prior art example of an attempt to locate the transmission axis perpendicularly with respect to the engine crankshaft axis is shown in Japanese Patent Application Publication 56-20861, dated Feb. 26, 1981. That publication shows a drive gear located on one end of an engine crankshaft. The drive gear is connected through a friction clutch to the input shaft of a multiple speed transmission located on an axis parallel to the crankshaft axis. The multiple speed transmission, in turn, is connected to a transversely disposed output shaft that is geared to the torque output shaft of a multiple ratio transmission through torque transfer gearing.

A T-drive arrangement having cross-axis gears located externally of the engine is described in French Patent 933,078, issued Apr. 9, 1948. This disclosure describes a driveline having a neutral clutch located at the torque output side of the cross-axis gearing in a cross-axis housing. The output side of the neutral clutch is connected to a concentric torque input shaft for a multiple ratio transmission. The input side of the transmission is connected to a conventional driveshaft for the rear vehicle wheels. This arrangement has an obvious space penalty in both the transverse direction and the fore-and-aft direction.

Another example of a cross-axis drive somewhat similar to the design of the French patent is shown in U.S. Pat. No. 1,991,575. In the case of the design of the '575 patent, right angle drive bevel gears are located on the torque output side of a neutral clutch for the engine. No attempt is made in the design of either the '575 patent or the French patent to provide a cross-axis drive connection having an integrated engine crankshaft and gearing arrangement.

Each of these prior art teachings of T-drives is characterized by an undesirable complexity because of the additional gearing required to transfer torque from the crankshaft to the input side of the multiple ratio gearing. They are characterized also by an undesirable space penalty which would make it impossible to use such a design approach in a vehicle design that requires a low profile in the forward engine compartment and which requires a maximum cargo and passenger space.

SUMMARY OF THE INVENTION

It is an object of my invention to establish a reduced engine height and to reduce or to eliminate the intrusion of the transmission and transaxle assembly into the passenger compartment, thereby increasing the cargo space and the space for the vehicle passengers. It is an object also to reduce the vehicle length while maintaining a high degree of crash capability in comparable to existing vehicles having a front-wheel drive transaxle and engine assembly of the kind described, for example, in the '389 patent. Although it is possible to reduce the crush distance in the forward structure of the vehicle by reason of the space savings made available by my invention, the so-called non-crush distance also is reduced so that the overall crash-worthiness of the vehicle, compared to vehicles with a conventional U-drive type transaxle and engine assembly, is not compromised.

It is also an object of my invention to provide a powertrain package with a lower engine height which will make it possible to reduce the profile of the hood and the cowl of the vehicle and to permit greater design flexibility for the vehicle designer. It is an object also to reduce the space within the engine compartment required for the engine and transaxle, thus making it possible to package other components for the vehicle, such as the brake booster, the alternator, the power steering pump and suspension components.

My improved engine and transmission assembly is readily adaptable for either a front-wheel drive vehicle or an all-wheel drive vehicle. With minor modifications, it may be used also in a vehicle having rear-wheel drive only. These design variations can be achieved with increased commonality in the components, thus reducing complexity and manufacturing cost.

It is an object also to provide a transaxle and engine assembly having a significant weight reduction for any given torque transmitting capacity. This weight reduction is achieved because of the reduced vehicle exterior size and the reduced number of components within the engine and transaxle assembly itself, regardless of whether the application requires front-wheel drive, rear-wheel drive, or all-wheel drive.

The advantages mentioned in the foregoing description are achieved by arranging the axis of the transmission gearing and the axis of the engine crankshaft to form a configuration in the form of a "T". This T-drive configuration makes it possible to establish a geared connection between the torque input side of the multiple ratio gearing and the engine crankshaft by providing a bevel gear at a strategic position on the engine crankshaft so that it may engage directly the torque input pinion for the transmission. The torque input pinion, or side gear, is arranged so that it will clear the engine piston connecting rod path for an adjacent cylinder as the rod crank end rotates in its circular pattern. The gear carried by the crankshaft, furthermore, is arranged so that it clears the piston skirt when the adjacent crank of the crankshaft is in its bottom dead center position. This arrangement makes it possible to use a relatively large pitch diameter crankshaft gear and transmission input pinion, thus reducing the gear tooth loading, even at peak engine firing torques. This is accomplished while providing acceptable pitch line speeds for the gear teeth.

Unlike prior art designs, the gear on the engine crankshaft is strategically positioned intermediate the ends of the crankshaft, preferably near its mid-position. The engine dynamic forces that are transmitted to the crankshaft and the loading that results from the engine firing forces and torques thus have minimal effect on the torque transmitting characteristics and the gear tooth loading for the crankshaft gear that forms a part of the so-called T-drive. Gear tooth durability is not adversely affected.

The crankshaft gear is located on the crankshaft near the midpoint of the crankshaft. It is displaced from the midpoint by an amount approximately equal to the pitch radius of the torque input bevel pinion for the transmission with which it meshes. Thus, the crankshaft is divided effectively into two crankshaft portions, each portion having its own natural torsional frequency. The crankshaft gear, therefore, is located at an effective nodal point for the first natural torsional frequency for each crankshaft portion. The first natural torsional frequency for each crankshaft portion is substantially higher than the comparable frequency that would be characteristic of a crankshaft in which the crankshaft gear would be located at either crankshaft end as in the case of the prior art designs discussed here.

In a 3.8 liter six cylinder version of my T-drive, the first natural torsional frequency has been measured at about 512 cycles/sec. when no crankshaft damper is used. If the crankshaft gear were to be mounted at a crankshaft end, the first natural torsional frequency would be about 328 cycles/sec. with no crankshaft damper. Thus, the crankshaft of my T-drive is substantially stiffer than a similar crankshaft of any of the prior art designs.

By locating the crankshaft gear of my T-drive at its near midpoint position, an effective mid-position nodal point is created. This is due to the effect of the inertia mass of the crankshaft gear itself as well as the rotary inertia mass of the transmission including the torque input bevel pinion with which the crankshaft gear meshes.

By positioning the crankshaft gear and its mating transmission torque input pinion or side gear near a mid-position on the crankshaft, it is possible to arrange the engine crankshaft in a transverse or east-to-west direction with the axis of the transmission and gearing in a "north-south" direction within the engine compartment. The transmission and engine assembly is generally at a mid-position with respect to the center plane of the vehicle. Thus, any front-end collision of the vehicle that would involve the non-crushable structural components of the vehicle will not cause the transmission housing to intrude into the space within the vehicle passenger compartment occupied by the vehicle driver and the front seat passenger. If the transmission assembly is displaced as a result of a front-end impact, displacement will occur generally on the vehicle center plane between the driver and front passenger positions.

The strategic positioning of the crankshaft gear and the cooperating gear elements of my improved T-drive results in a reduction in the ability of the assembly to transmit gear noise to the passenger compartment because it is surrounded by a large metal mass which tends to isolate any gear noise.

BRIEF DESCRIPTION OF THE DRAWINGS

FIG. 2C is a schematic view of the engine, as seen from the bottom of the engine, in which the engine crankshaft bevel gear and the cooperating transmission bevel gear are shown in their operating positions relative to the positions of the adjacent cylinders.

FIG. 3 is a cross-sectional assembly view of a T-drive assembly wherein provision is made for delivering torque from a turbine shaft of a cross-axis drive to a driveshaft for a rear-wheel drive differential assembly whereby the T-drive is adaptable for an all-wheel drive vehicle.

FIGS. 4A and 4B show a cross-sectional assembly view of a modified gearing arrangement for delivering torque from the turbine shaft of the T-drive assembly to a driveshaft for the rear-wheel drive differential and for offsetting the front-wheel drive differential gearing to provide a further reduction in axial length of the overall assembly.

FIGS. 6A and 6B show schematic cross-sectional views, partly in elevation, taken along the fore-and-aft geometric center plane of a vehicle incorporating the T-drive assembly of this invention. The views show the reduction in the space in the engine compartment required for the T-drive in comparison to the space required for an engine and transaxle for a current production vehicle in the same size range and the effect the T-drive assembly has on crush distance during a front-end vehicle impact.

FIG. 7 is a graph showing a comparison of the angular displacement for the first natural torsional frequency of a crankshaft with a crankshaft gear located at a crankshaft end to the angular displacement for the first natural torsional frequency of a crankshaft with the mid-position gear of this invention.

PARTICULAR DESCRIPTION OF THE INVENTION

Figure 1A:
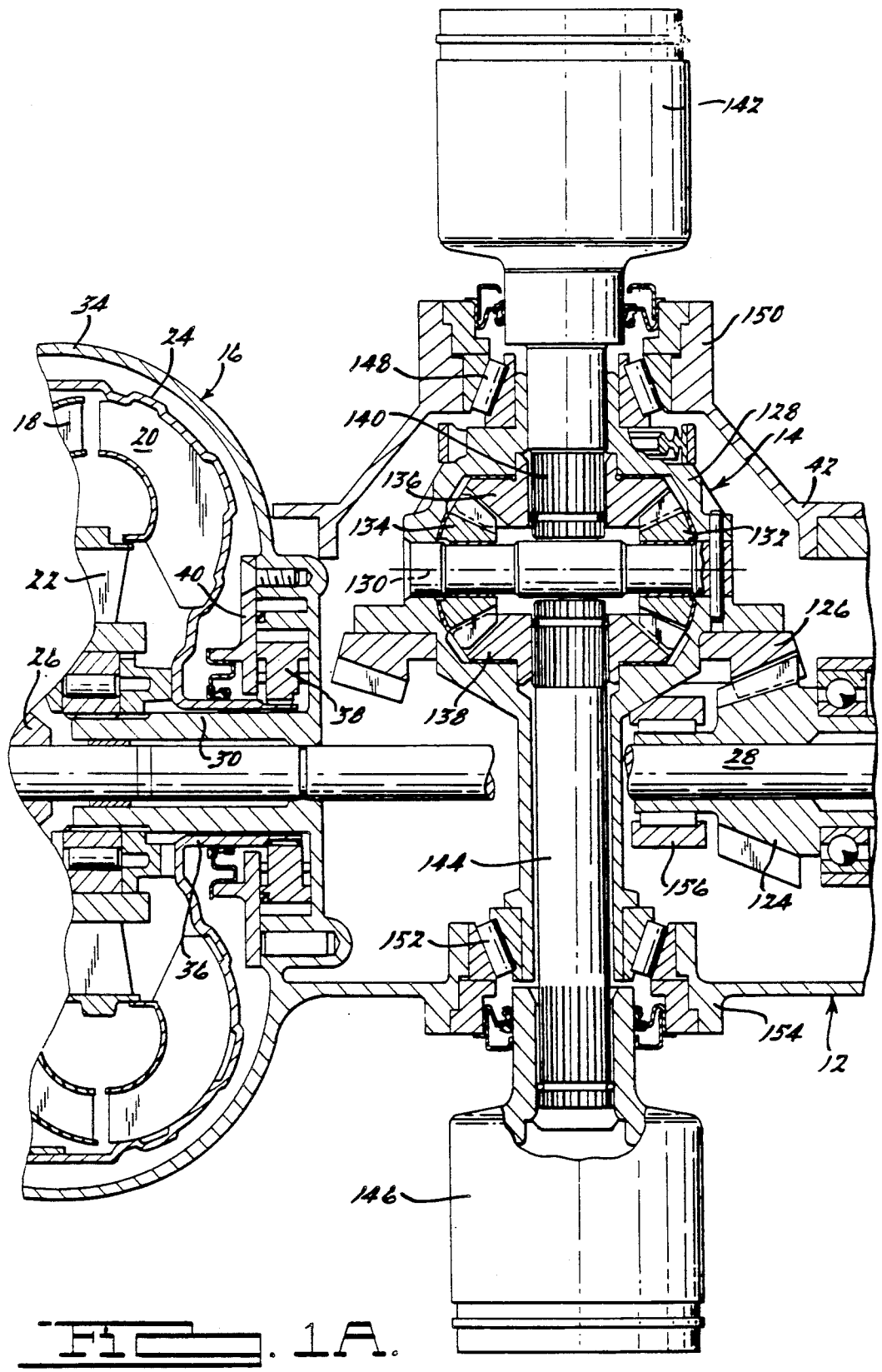
FIGS. 1A and 1B show a cross-sectional view of a multiple ratio gear assembly and right angle drive for use in a T-drive configuration with an engine, not shown.
Figure 1B:
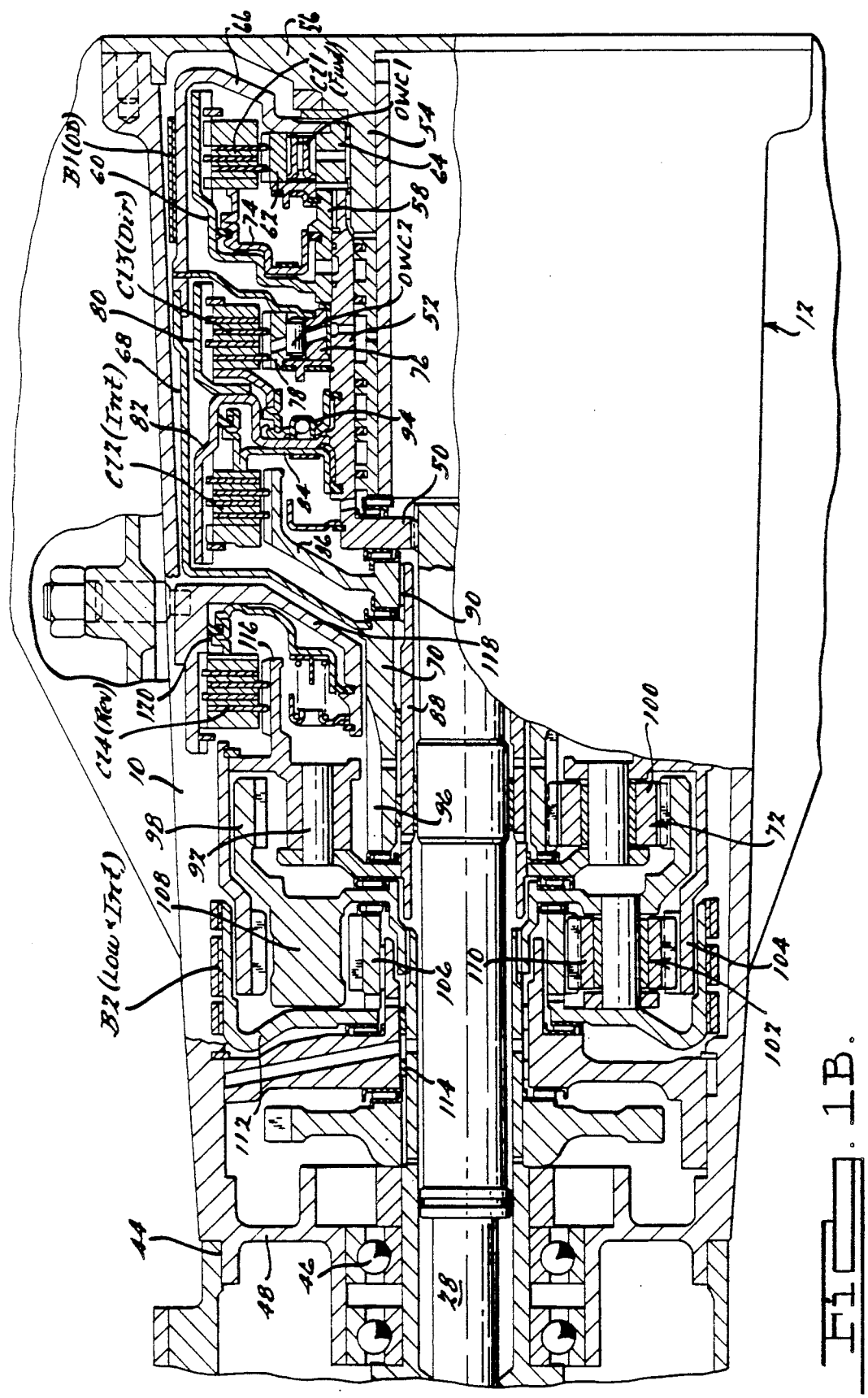

In FIGS. 1A and 1B, numeral 10 designates the transmission gear housing of a four-speed ratio planetary transmission, the latter being designated generally by reference character 12. A drive axle and differential assembly for the forward traction wheels of a vehicle is generally designated by reference numeral 14. A hydrokinetic torque converter is generally indicated at 16.

The Torque Converter

The torque converter 16 includes a bladed turbine 18, a bladed impeller 20 and a bladed stator 22 arranged in toroidal fluid flow relationship in known fashion. Impeller 20 includes an impeller shell 24 which forms a part of the converter housing. Turbine 18 is connected to a turbine hub 26, which is splined to turbine shaft 28, the latter extending through stationary sleeve shaft 30 connected to or formed integrally with torque converter housing 32. The periphery 34 of the converter housing 32 is secured by bolts to the cylinder block of an engine that will be described subsequently.

Impeller 20 includes a hub sleeve shaft 36 journalled on stationary sleeve shaft 30. It is connected drivably to the torque input gear of a gear pump assembly 38, which is adapted to supply fluid pressure to the clutch and brake servos for the automatic transmission. The pump assembly 38 may be one of a variety of known positive displacement transmission pump assemblies. The pumping elements are enclosed in a pump cavity defined by the converter housing and by pump end plate 40.

The front-wheel, right-angle drive and differential assembly is disposed in an intermediate housing 42. The right-hand side of the housing 42 is secured to the left-hand side of the planetary transmission gear housing 10, as shown at 44 in FIG. 1B. The housing 42 is situated between the converter housing 32 and the transmission gear housing 10. Turbine shaft 28 extends through the housing 42 and is journalled at 46 in an end wall 48 of the transmission housing 10 as seen in FIG. 1B. The right-hand end of the turbine shaft 28 is splined at 50 to torque input sleeve shaft 52 of the planetary gearing. The right-hand end of the sleeve shaft 52 is journalled on support sleeve 54 which forms a part of the end wall 56 of the housing 10. For a particular description of the clutch and brake system and the planetary gearing for the transmission 12, reference may be made to U.S. Pat. No. 4,509,389. The clutch and brake elements and the gearing shown in FIG. 1B, however, are transposed with respect to the disposition of the clutch and brake elements and the gearing of the '389 patent, although the modes of operation of the two structures are similar.

The Planetary Transmission

Torque input sleeve shaft 52 is splined to the hub 58 of a cylinder 60 member, which forms a part of a forward clutch designated by the symbol CL1. Clutch CL1 is a multiple-disc clutch having clutch discs splined to the outer periphery of the cylinder member 60 and companion clutch discs splined to the outer race 62 of an overrunning clutch designated by the symbol OWC1. The inner race 64 of overrunning clutch OWC1 is connected drivably to torque transfer shell 66, which serves as a brake drum for an overdrive friction brake band designated by the symbol B1. Brake band B1 surrounds the outer periphery of torque transfer shell 66. Shell 66 is connected to torque transfer shell 68 which, in turn, is secured to sun gear sleeve shaft 70 for planetary gear unit 72.

Annular piston 74 is disposed in the annular cylinder 60 and cooperates with the cylinder 60 to define a pressure cavity which, when pressurized, causes a piston force to be applied to the friction discs of the clutch CL1, thereby drivably connecting the torque input sleeve shaft 52 to the outer race 62 of the overrunning clutch OWC1.

Torque transfer drive shell 68 is connected to the inner race 76 of the overrunning coupling OWC2. The outer race 78 of the overrunning coupling OWC2 is splined to friction clutch discs of the clutch CL3, which is a direct-drive clutch. Companion friction discs for the direct-drive clutch CL3 are connected directly to clutch member 80, which in turn is drivably connected to intermediate servo cylinder 82. Cylinder 82 encloses an annular piston 84 that cooperates with cylinder 82 to define a pressure chamber which, when pressurized, causes friction discs of the intermediate clutch CL2 to become applied. Externally splined discs of the clutch CL2 are carried by the clutch cylinder 82, and internally splined discs of the clutch CL2 are splined to clutch member 86. Sleeve shaft 88 surrounds turbine shaft 28 and is splined at 90 to the clutch member 86. Sleeve shaft 88 is connected directly to carrier 92 of the planetary gear unit 72.

Cylinder member 82 also defines an annular cylinder which forms a part of the servo for actuating direct-drive clutch CL3. Annular piston 94 disposed in the cylinder for the clutch CL3 defines with that cylinder a pressure chamber which, when pressurized, causes the piston 94 to apply the friction discs of the clutch CL3. This establishes a driving connection between the outer race 78 of the overrunning clutch OWC2 and the clutch member 80. Alternate ones of the friction discs are splined to overrunning clutch race 78 and the clutch member 80, respectively.

Planetary gear unit 72 includes, in addition to the sun gear 96, which is connected to sun gear shaft 70, a ring gear 98 and planetary pinions 100 journalled on carrier 92. A second simple planetary gear unit 102 includes ring gear 104, sun gear 106, carrier 108 and planetary pinions 110 journalled on the carrier 108. Sun gear 106 is connected to brake drum 112 about which is positioned a brake band B2 for low-and-intermediate speed ratio operation.

As indicated in FIG. 1B, the carrier 108 is connected directly to the ring gear 98 of the planetary gear unit 72. Carrier 108 is connected also directly to torque output shaft 114, which is journalled about the axis of the turbine shaft 28. Carrier 92 carriers clutch member 116, which has clutch discs of a clutch disc assembly. Those clutch discs and cooperating fixed friction discs carried by the transmission housing 10 form a reverse brake identified by the symbol CL4. Transmission housing 10 also defines a brake cylinder 118 which receives reverse brake piston 120. When the pressure chamber defined by the piston 120 and the cylinder 118 is pressurized, the piston 120 frictionally engages the friction discs of the reverse brake CL4. When the brake CL4 is applied, both the carrier 92 of the planetary gear unit 72 and the ring gear 104 of the planetary gear unit 102 are braked.

Figure 1C:
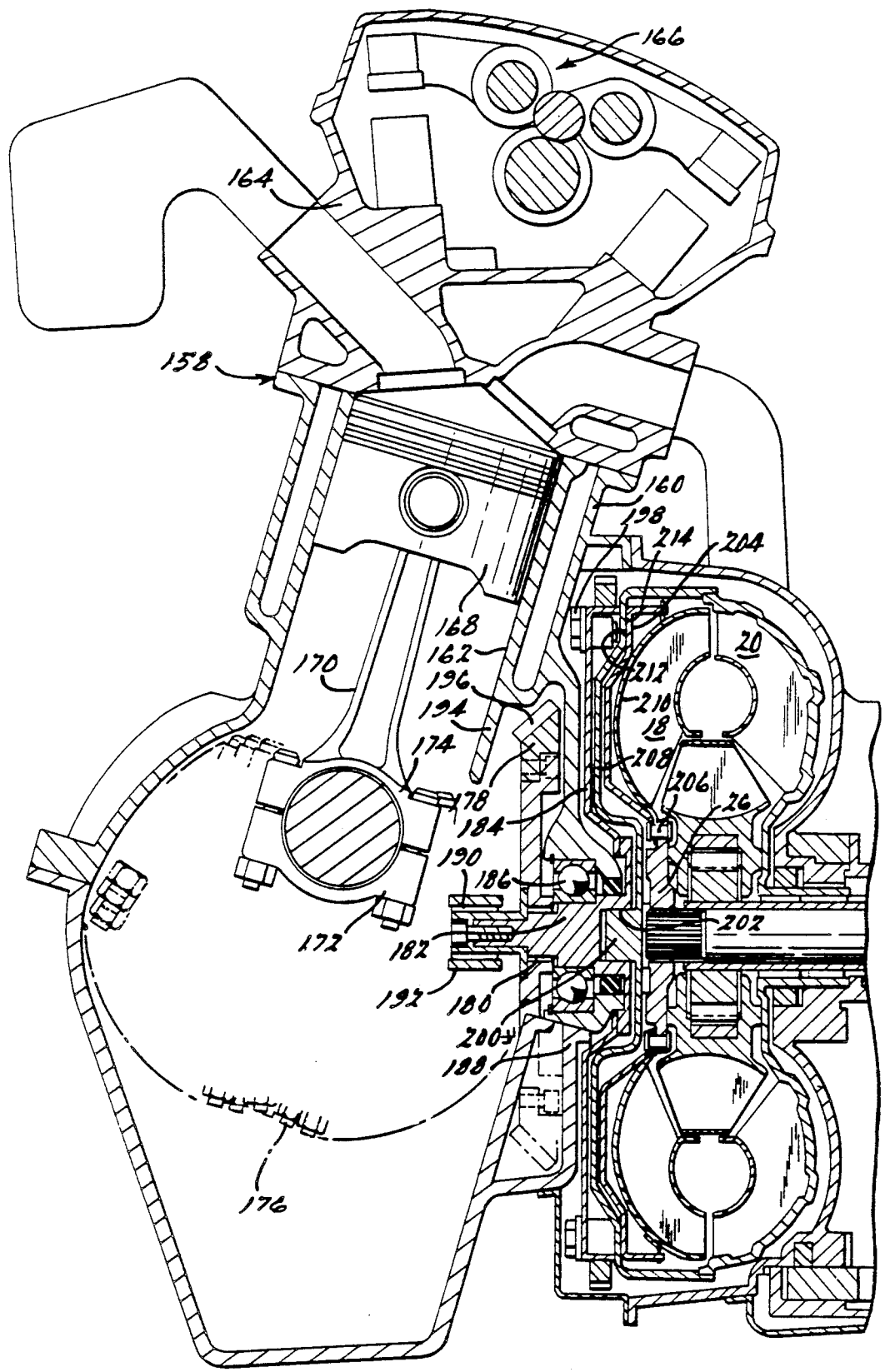
FIG. 1C is a cross-sectional assembly view of a portion of an internal combustion engine and a portion of a bevel gear drive for connecting the engine crankshaft to the transmission and right-angle drive assembly shown in FIG. 1A.
Figures 1D, 2A:
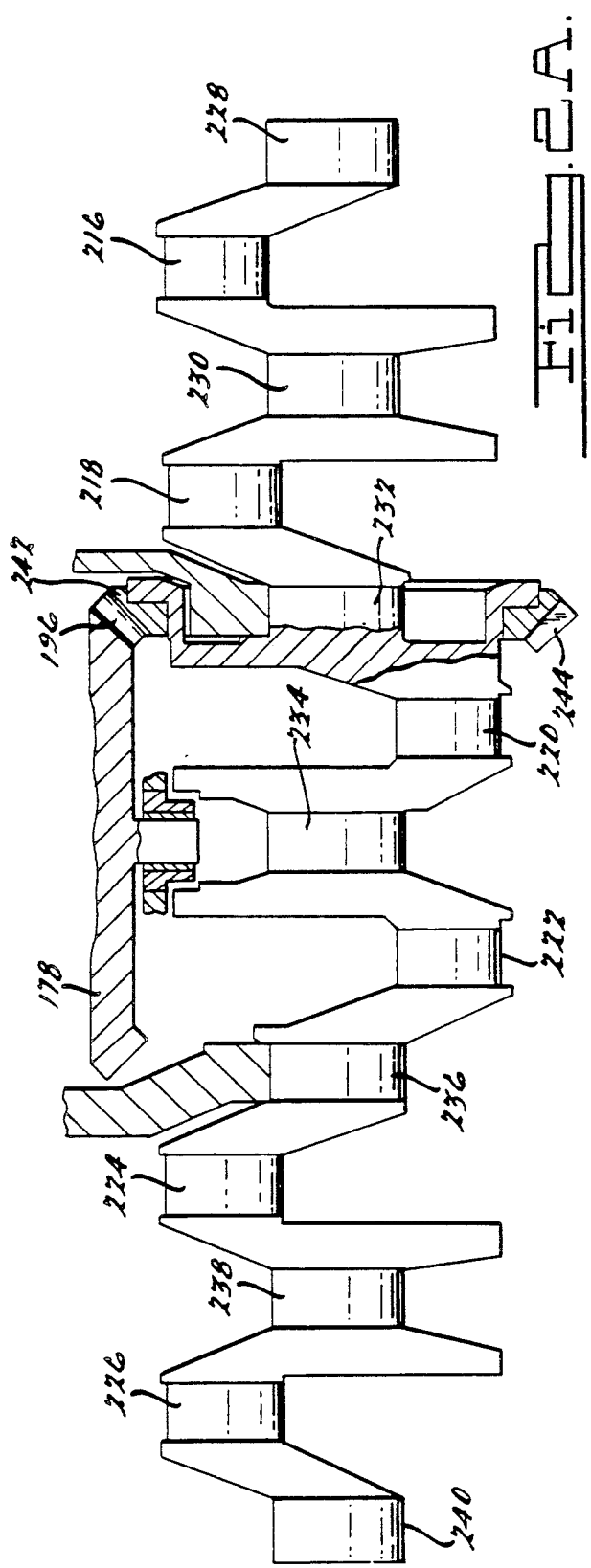
FIG. 1D is a chart that shows the clutch and brake engagement and release pattern for the planetary gear elements of the multiple ratio planetary transmission which forms a part of the T-drive assembly.
FIG. 2A is a side view, partially in section, showing a six-cylinder engine crankshaft and T-drive bevel gears therewith.

By referring to FIG. 1D, the mode of operation of the clutches and the brakes of the assembly view of FIG. 1B can be understood. FIG. 1D shows in tabular form the clutches and the brakes that are engaged for each of the designated gear ratios. For example, to achieve the first drive ratio, clutch CL1, which is a forward clutch, is applied.

When brake B2 is applied, the sun gear 106 acts as a reaction point. Sun gear 96 acts as a torque input element since it is driven by the torque transfer shell 68 as torque is delivered to the shell 68 through the overrunning coupling OWC1 from the torque input clutch sleeve shaft 52. If coast braking is desired, clutch CL3 may be applied to permit transfer of coasting torque through overrunning coupling OWC2.

To achieve a ratio change to the second speed ratio, brake B2 remains applied and clutch CL2 is applied, thus permitting torque transfer from the torque input sleeve shaft 52 through the clutch CL2 and through sleeve shaft 88 to the carrier 92. Sun gear 106 continues to act as a reaction member and overrunning clutch OWC1 freewheels.

Third speed ratio overdrive operation is achieved by engaging simultaneously clutches CL2 and CL3 while clutch CL1 remains applied. Thus all of the planetary gear elements are locked together for rotation in unison, which establishes a one-to-one direct drive ratio.

Fourth speed ratio overdrive operation is achieved by releasing the clutch CL1, applying the clutches CL2 and CL3, and applying the overdrive brake band B1. With the carrier 92 thus acting as a torque input element and with the sun gear 96 acting as a reaction meter, the ring gear 98 is overdriven, thereby overdriving the torque output shaft 114.

Reverse drive is obtained by engaging clutch CL1, reverse brake CL4 and clutch CL3. Carrier 92 now acts as a reaction point With the clutch CL3 acting as a torque input clutch, the sun gear 96 is driven in the driving direction, but the ring gear 98 is driven in a reverse direction, thus driving the carrier 108 in a reverse direction.

The Right Angle Drive

Torque output shaft 114 is connected to bevel pinion 124, which meshes with bevel gear 126, the latter acting as a ring gear for the differential assembly 14. Ring gear 126 is carried by differential housing 128 which in turn carries pinion shaft 130. Pinions 132 and 134 are carried within the housing 128, and they mesh with differential side gears 136 and 138. Side gear 136 is connected to torque output shaft 140 which may be connected by a universal joint 142 to a half-shaft that extends to one front traction wheel for the vehicle. Side gear 138 is splined to output shaft 144 which is adapted to be connected by universal coupling 146 to a second half-shaft for the other front traction wheel for the vehicle. Output shaft 140 is journalled by tapered roller bearing 148 and by a bearing support 150 which forms a part of the housing 42. Similarly, bearing 152 journals the other torque output shaft 144 in a bearing support 154 which forms a part of the housing 42.

The outboard end of the shaft 114 is journalled in bearing support 156, which also forms a part of the housing 42.

The Engine

In FIG. 1C, reference numeral 158 designates generally an internal combustion engine having a cylinder block 160 in which is formed a plurality of cylinders, one of which is designated by reference numeral 162. A cylinder head 164 encloses air-fuel mixture intake and exhaust port structure as well as a valve actuating mechanism for the engine, as indicated generally at 166.

A piston 168 reciprocates in the cylinder 162. The piston is connected to a piston rod 170 in the usual fashion by a wrist pin. The base of the piston rod is connected by a connecting rod bearing to a bearing portion of the crank of the crankshaft that will be described with reference to FIG. 2A. A connecting rod bearing cap 172 secures the connecting rod to the connecting rod base 174.

The path followed by the connecting rod base and bearing cap, as the crankshaft rotates, is illustrated in the multiple position illustration identified generally by reference numeral 176.

A pinion gear 178, which serves as a torque input element for the impeller of the torque converter, is splined at 180 to a hub 182 which, in turn, is connected drivably to drive plate 184 for the torque converter assembly. The hub 182 is journalled by bearing 186 in the bearing opening formed in an end wall 188 of the cylinder block 160.

Bevel gear 178 is straddle mounted between bearing 186 and the secondary bearing 190 located in a bearing support 192, which forms a part of the engine cylinder block 160.

The skirt 194 of the cylinder 162 is disposed relative to the gear teeth 196 in close proximity, although interference is avoided as the gear 178 is assembled.

Drive plate 184 is secured by bolts 198 to the outer periphery of the impeller housing. The center of the impeller housing has a pilot hub 200 received in pilot opening 202 formed in the gear hub 182.

A flexible lock-up clutch piston plate 204 is secured by rivets 206 to the turbine hub 26. It extends radially in the space within the impeller housing between the impeller housing forward wall 208 and the outer shroud 210 of the turbine 18. When the cavity between the flexible piston plate 204 and the wall 208 is pressurized, a friction surface 212 on the outer periphery of the plate 204 disengages a companion friction surface 214 on the wall 208. On the other hand, when the pressure in that pressure cavity is reduced, the pressure in the torus circuit in the converter applies a clutch-engaging force to the piston plate 204, thereby locking the turbine 18 to the impeller housing.

As seen in FIG. 2A, the crankshaft for the engine has six crank portions, one for each of the six cylinders. These crank portions are identified, respectively, by reference numerals 216, 218, 220, 222, 224 and 226. Each crank portion has a crankshaft bearing situated on either side as shown at 228, 230, 232, 234, 236, 238 and 240. At the location between crank 218 and crank 220, there is carried a bevel gear 242 which is connected directly to the crankshaft generally in the plane of the bearing 232. Gear 242 has bevel gear teeth 244 which mesh with bevel gear teeth 196 on bevel gear 178, which was described previously with reference to FIG. 1B. Bevel gear 178, as mentioned previously, serves as a torque input gear for the torque converter impeller housing.

Figure 2B:
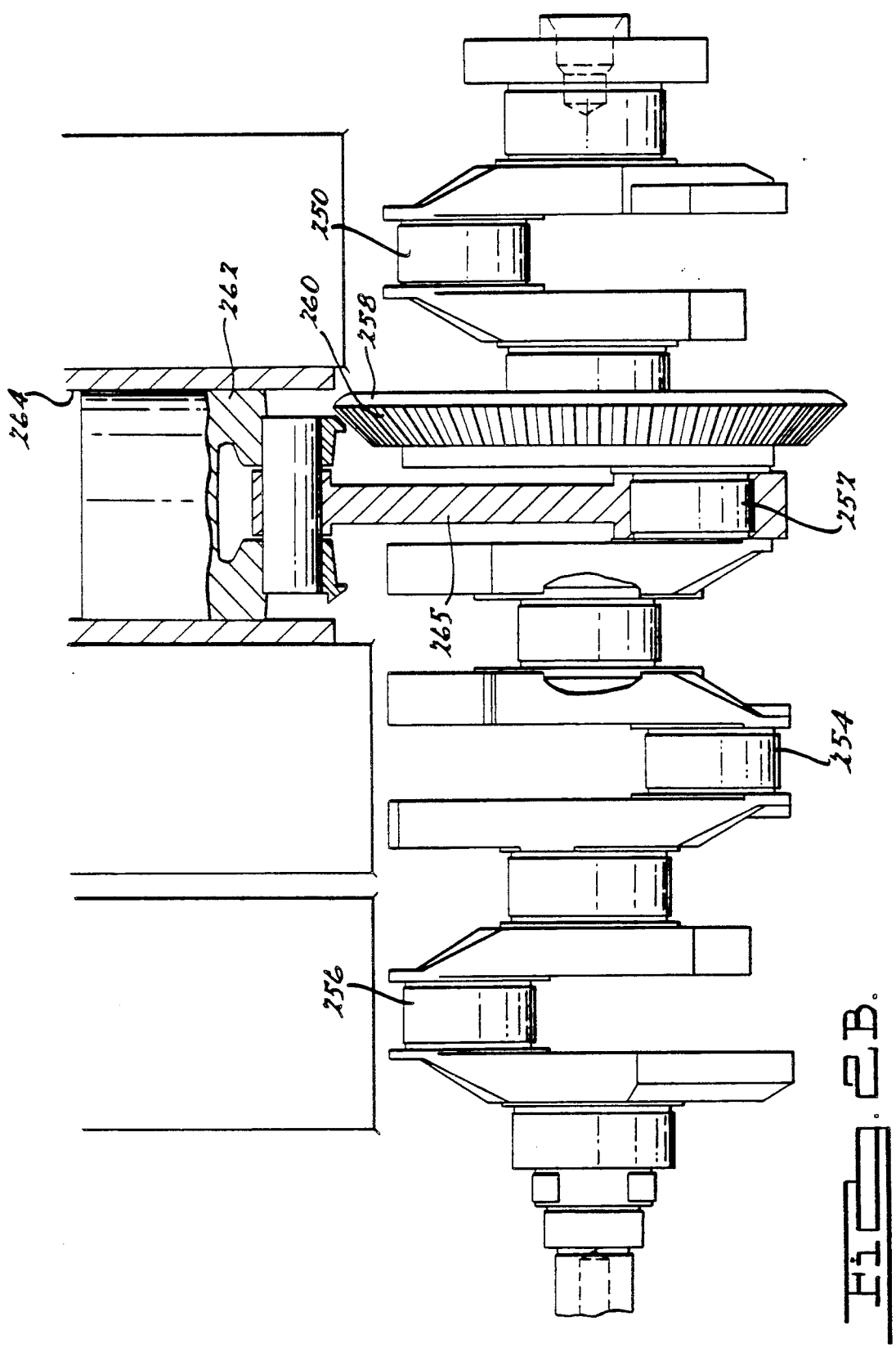
FIG. 2B shows a four-cylinder engine crankshaft for an engine adapted to be used in a T-drive assembly of the kind in FIGS. 1A and 1B. Illustrated in FIG. 2B is a bevel gear carried by the engine crankshaft adjacent a crankshaft bearing and a piston and piston rod adjacent the bevel gear. The piston rod is shown in its bottom dead center position.

The crankshaft gear and the piston of the adjacent cylinder are dimensioned so that interference between them is avoided when the piston is stroked to its bottom dead center position. To observe this, reference should be made to FIGS. 2B and 2C. In FIGS. 2B and 2C, there is shown in part a four cylinder version of the T-drive assembly. Included in FIGS. 2B and 2C is an illustration of a crankshaft gear and its position relative to the piston of the four cylinder engine when the piston is stroked to its bottom dead center position. The design considerations in designing the piston and the gear of the arrangement shown in FIGS. 2B and 2C are the same as those design considerations that would be necessary for avoiding interference between the crankshaft gear and the piston in the six cylinder version described previously.

In FIG. 2B, the cranks for the four cylinder crankshaft are identified by numerals 250, 252, 254 and 256. The crankshaft gear shown at 258 corresponds to the crankshaft gear 242 for the six cylinder engine described previously.

Helical gear teeth 260 are formed on the gear 258. When the piston 262 of the four cylinder engine is stroked to its bottom dead center position, the gear teeth 260 avoid interference between the bottom edge of the skirt for the piston 262, as indicated.

Piston 262 is connected in a conventional fashion by means of a wrist pin to connecting rod 265, which is secured to the bearing portion of the crank 252 in the usual fashion.

FIG. 2C is a view of the engine from the perspective of a point in a direction parallel to the direction of the cylinder axes. The position of the crankshaft gear 258 is arranged relative to the cylinder 264 for the piston 262 so that interference between the piston and the gear 258 is avoided, as explained previously. Gear 258, as seen in FIG. 2C, meshes with gear 266, which corresponds to the gear 178 described with reference to the six cylinder crankshaft of FIG. 2A.

In FIG. 7, I have shown a graph illustrating, for any given engine torque, the differences in the torsional vibration characteristics for a crankshaft in which the crankshaft gear is mounted at or near one crankshaft end and a crankshaft on which the crankshaft gear is strategically positioned near a mid-position location. In the case of a conventional crankshaft with a gear mounted at one crankshaft end, the amplitude of the torsional vibration in the first natural frequency mode is represented by line "B". The nodal point at the end of the crankshaft is shown at the point designated "node B". The angular displacement at the other end is a maximum. By strategically locating the gear near mid-position, the crankshaft angular displacement at the ends is greatly reduced. The "node A" point designates the location of the mid-position gear and the symbols "A" and "A," designate the amplitude of the crankshaft on either side of the nodal point. It is apparent from FIG. 7 that the effective crankshaft stiffness is greatly increased.

The nodal point "A" is displaced from the actual midpoint of the crankshaft by an amount equal to the pitch radius of the driven bevel gear with which the crankshaft bevel gear is engaged. Thus, the axis of the driven gear intersects the crankshaft axis approximately at midpoint.

All-Wheel Drives

In FIG. 3, I have shown a modification of the T-drive described in the foregoing text. The embodiment of FIG. 3 includes the same cross-axis bevel gearing arrangement described with reference to the six cylinder engine. It may include also similar transmission structure identified generally with reference to FIG. 1A. The transmission structure in FIGS. 1A and 3 is identified generally by reference character 12. Thus, the reference characters used to identify this transmission structure in FIG. 3 are the same as the reference characters for corresponding portions of the torque converter and cross-axis gearing described previously.

The bevel pinion which serves as a torque input element for the multiple ratio gearing of the transmission 12 of the FIG. 1A embodiment is identified in phantom lines in FIG. 3 and is similarly identified by reference character 124. Bevel pinion 124 engages bevel gear 270. Gear 270 is located in a half-shaft and differential housing that corresponds to the housing 42 described with reference to FIG. 1A. That housing is identified in FIG. 3 by reference numeral 274. A differential assembly 276 corresponds to the differential assembly 14 of the FIG. 1A embodiment. Differential assembly 276 has a half-shaft connected to one of its side gears, as shown at 278, and a companion half-shaft 280 is connected to the other side gear of the differential assembly 276. Each half-shaft is connected to a traction wheel for the front-wheel drive vehicle as explained previously.

Ring gear 270 has secured thereto a secondary bevel gear 282 which rotates with bevel gear 270. Bevel gears 282 and 270 are connected together as a unitary assembly for rotation about the common axis of the half-shaft 280. Bevel gear 282 meshes with output bevel gear 284, which is journalled in a housing extension 286 of the housing 274 by means of tapered roller bearings 288. Bevel gear 284 is splined at 290 to torque transfer shaft 292, which extends in a direction parallel to the direction of the axis of the transmission 12 through the rear-most location for the transmission 12 where it is joined to torque transfer gear 294 journalled on the transmission housing.

Gear 294 meshes with output gear 296 which is mounted rotatably in bearing support 298 at the rear of the transmission 12 for rotation about the axis of the transmission 12. It is adapted to be connected by a universal joint, shown in part at 300, to one end of the driveshaft that extends in the usual fashion to a rear-wardly mounted differential and axle assembly for rear traction wheels for the vehicle. Thus, the T-drive assembly of FIG. 3 is adapted for all-wheel drive operation. A minimal transverse dimensional increase is required to accommodate the additional gear 282 and the output gear 284. Thus, the transverse dimensions of the T-drive assembly itself can readily be accommodated in a powertrain package for the vehicle without undue space penalty.

Figure 4A:
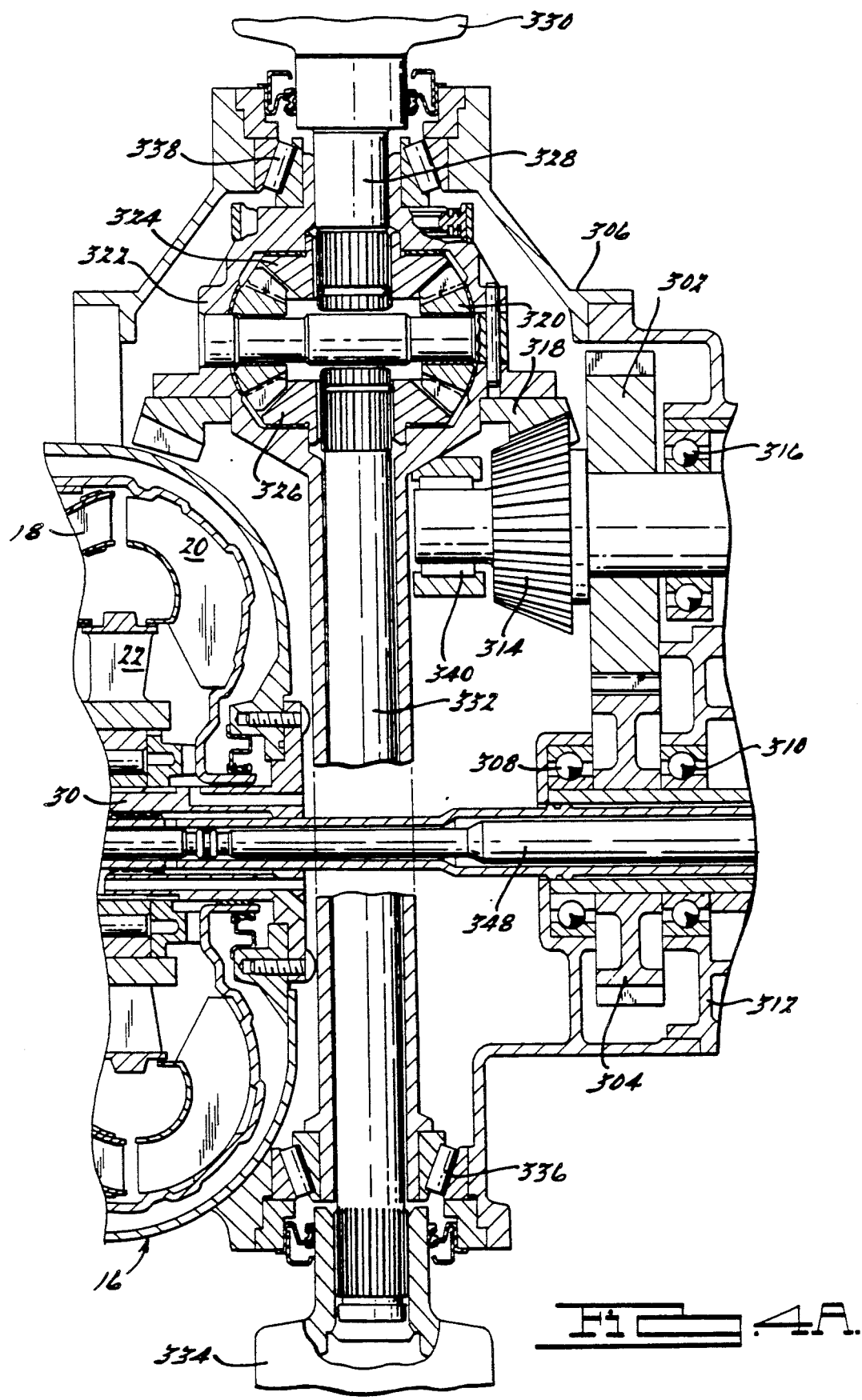

In FIGS. 4A and 4B, I have shown a still further modification of the invention. As seen in embodiment of FIGS. 4A and 4B, the T-drive assembly is adaptable for an all-wheel drive vehicle, but provision is made for reducing the axial fore-and-aft dimensions of the overall assembly relative to the corresponding axial dimensions of an embodiment of the kind shown in FIG. 3. In the embodiment of FIGS. 4A and 4B, a front-wheel drive half-shaft differential assembly is disposed between the transmission and the torque converter on one side of the torque converter housing. Thus, it is possible to avoid interference between the half-shaft front-wheel drive differential assembly and the torque converter housing as the front-wheel drive half-shaft and differential housing assembly is moved toward the engine. This is accomplished by introducing torque transfer gears 302 and 304 on the torque output side of the transmission. In the case of the embodiment of FIGS. 4A and 4B, the transmission may be the same as the transmission described with reference to FIG. 1A. Thus, numeral 12, which is used in FIG. 1A, is repeated in FIG. 4B to designate the transmission. Likewise, the converter housing and the torque converter assembly of the FIG. 1A embodiment may be common to the FIG. 4B embodiment. The reference characters used in describing that part of the FIG. 1A embodiment, therefore, also are repeated in FIGS. 4A and 4B.

In FIG. 4A, the housing for the front-wheel drive half-shaft and differential assembly is identified by reference numeral 306. The torque transfer gears 302 and 304 are located within the housing 306. Torque transfer gear 304 is connected drivably to the torque output sleeve shaft 114 of the transmission 12. Straddle mount bearings 308 and 310 support the gear 304. These bearings are supported by a bearing support 312 which forms a part of the housing 10 for the transmission 12.

Gear 304 drivably engages gear 302, the latter being connected directly to bevel pinion 314 which is mounted by bearings 316 in the housing 310. Differential ring gear 318 of the front-wheel drive differential assembly 320 engages the pinion 314. Ring gear 318 is carried by differential housing 322 in which is positioned a pair of side gears 324 and 326. A first output shaft 328 connected to the side gear 324 is joined to a front-wheel drive half-shaft by universal joint 330. Likewise, side gear 326 is connected drivably to output shaft 332 which, in turn, is connected by universal joint 334 to the companion half-shaft for the front-wheel drive. Traction wheel shaft 332 is journalled by bearing 336 in the housing 306, and output shaft 328 is journalled by a bearing 338 in the housing 306.

Bevel pinion 314, in addition to the bearing 316, has an inboard bearing 340 supported by a bearing support that forms a part of the housing 306.

A torque transfer shaft 342 is keyed for splined to the outboard end of the pinion shaft for pinion 314. As indicated in FIG. 4B, the shaft 342 extends to the rear of the transmission 12 where it may be coupled to a drive-shaft extending to the rear differential for the rear traction wheels of the vehicle. A conventional universal joint shown in part at 344 may be used to connect the shaft 342 to the drive-shaft extending to the rear axle and differential assembly.

Unlike the design of FIGS. 1A and 1B, the design of the FIGS. 4A and 4B embodiment includes a turbine shaft in the form of a sleeve 346. Extending through the sleeve 346 is a pump driveshaft 348. Shaft 348 extends concentrically through the planetary gearing and through the clutch and brake structure of the transmission 12 to a positive displacement pump 350 located in an end plate 352 secured to the end of the transmission 12. The drive gear of the pump 350 is connected by a spline to the end of the pump drive-shaft 348. The left-hand end of the driveshaft 348 is adapted to be connected directly to the impeller housing by means of a driving connection not particularly described or illustrated in FIG. 4A.

Rear-Wheel Drive Driveline

Figure 5A:
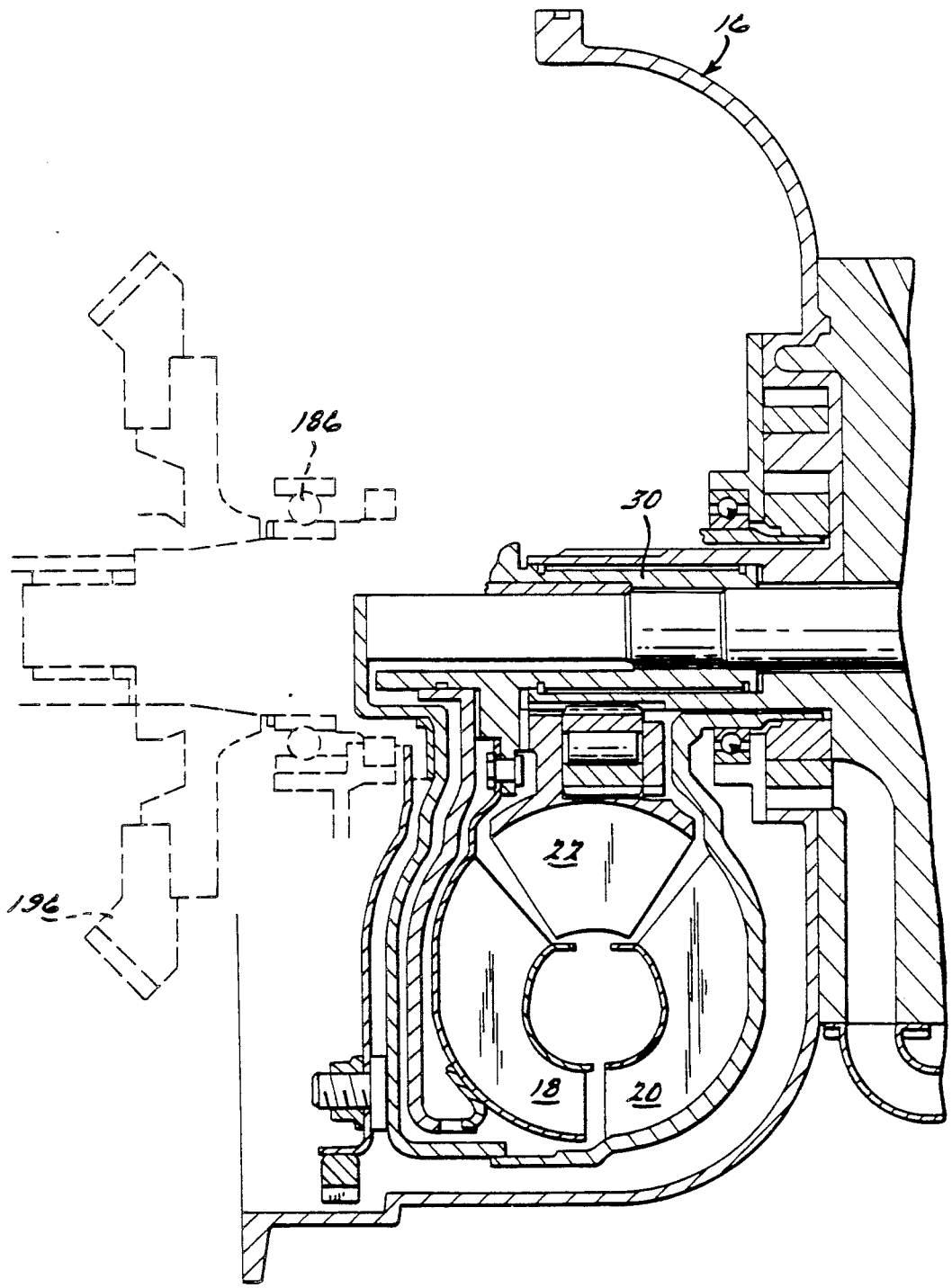
FIGS. 5A and 5B show a cross-sectional assembly view of a rear-wheel drive version of the T-drive assembly illustrated in FIGS. 1A and 1B but which does not include front-wheel drive.
Figure 5B:
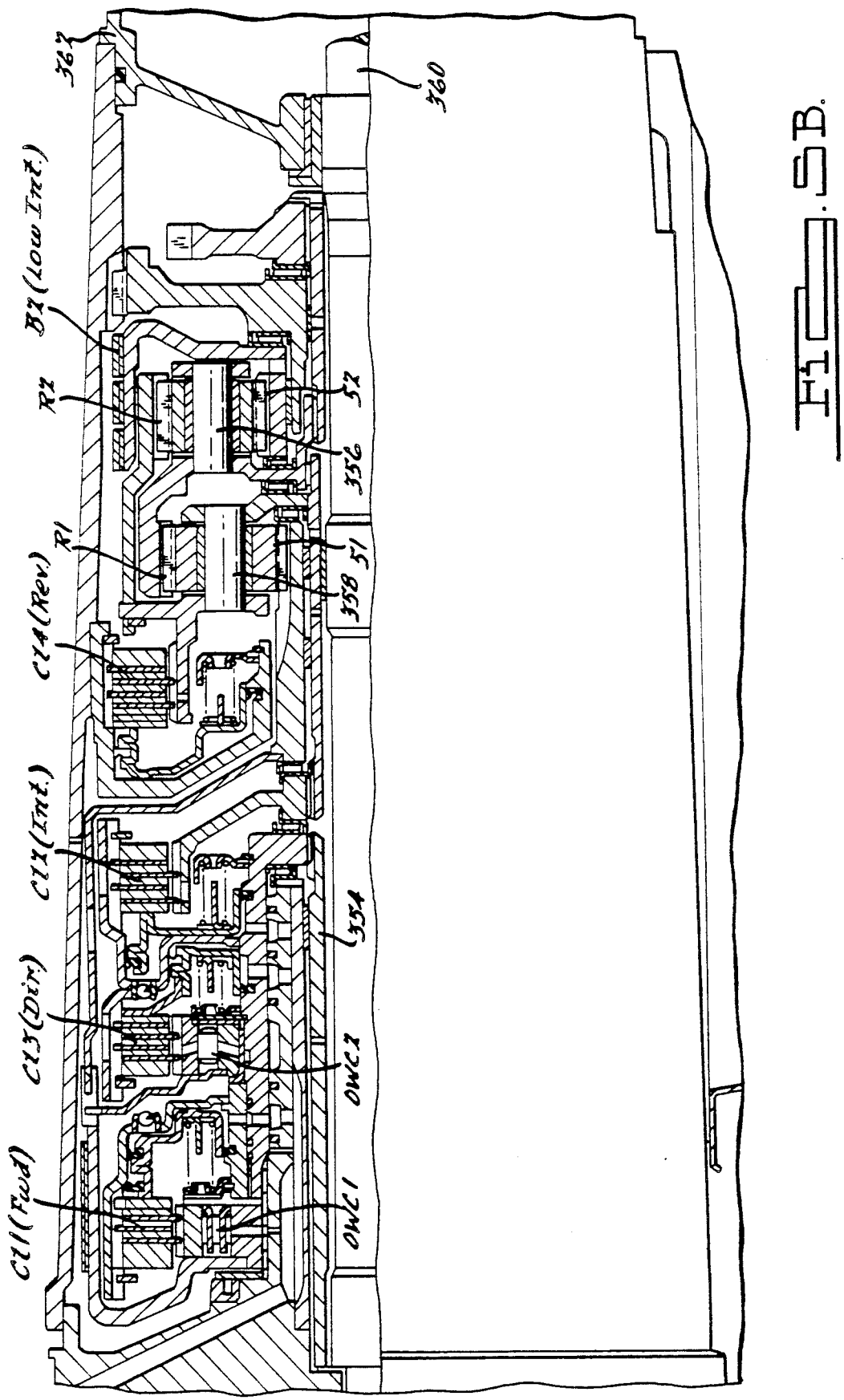

In FIGS. 5A and 5B, I have shown a rear-wheel drive version of the T-drive assembly described with reference to the previous figures. There is no provision in the modification of FIGS. 5A and 5B for a front-wheel drive half-shaft and differential assembly. Turbine torque from the torque converter is distributed directly to the torque input elements of the transmission of the embodiment of FIGS. 5A and 5B, and the driven element of the transmission is connected to a transmission tailshaft which is coupled in the usual fashion by means of the universal joint to the driveshaft for the rear-wheel drive vehicle.

In the embodiment of FIGS. 5A and 5B, the torque converter and the cross-axis gearing, including the crankshaft gear, is common to the embodiment shown, for example, in FIGS. 1A and 1B. Those portions of the assembly of FIGS. 1A and 1B that are common to the embodiment of FIGS. 5A and 5B have been identified in FIGS. 5A and 5B by similar reference numerals.

The transmission shown in FIGS. 5A and 5B is similar to the transmission 12 shown in FIG. 1A, but it has been inverted in a fore-and-aft direction so that the gearing is located toward the rear and the clutches and brakes are located toward the front.

In FIGS. 5A and 5B, the turbine shaft is shown at 354. As in the case of the arrangement of FIGS. 1A and 1B, turbine torque is delivered from the turbine shaft to the torque input side of each of the clutches CL2 and CL3 which are the intermediate clutch and the direct clutch, respectively. The clutches and brakes in the embodiment of FIGS. 5A and 5B have been identified by the same notations used in identifying the corresponding elements of the FIG. 1A embodiment of FIGS. 1A and 1B. A particular description of the embodiment of FIGS. 5A and 5B, therefore, will not be repeated here because of the similarity between the two assemblies. Likewise, the clutch and brake engagement and release pattern for the FIG. 5 embodiment is similar to the clutch and brake engagement and release pattern shown in FIG. 1C.

A torque output element of the planetary gearing, as in the case of the embodiment of FIGS. 1A and 1B, is the carrier for the second planetary gear unit 356. The carrier for the gear unit 356 is connected to ring gear R1 of the first planetary gear unit 358.

The output shaft for the transmission of the embodiment of FIGS. 5A and 5B is connected to and is formed integrally with transmission tailshaft 360, which extends through transmission extension housing 362.

Overview

It is apparent from the foregoing descriptions of the various embodiments of the invention that I have provided a T-drive assembly that may be adapted for a variety of driveline installations, including all-wheel drive, rear-wheel drive and front-wheel drive. This is accomplished while making possible a maximum degree of vehicle styling alternatives because of the reduced space requirements for the engine and transmission assembly. The reduction in vehicle size minimizes the non-crushable space in the front of the vehicle, reduces weight and greatly increases the packaging alternatives for various vehicle accessories associated with the vehicle engine. Furthermore, there is less intrusion of the powertrain into the passenger compartment, thereby increasing the cargo and passenger space.

The gear dynamics of the crankshaft bevel gear and the meshing cross-axis bevel gear of my T-drive are favorable for achieving maximum gearing durability because the inertia forces are reduced by the strategic positioning of the crankshaft gear at a nodal point near the crankshaft mid-position. The increased natural torsional frequency that results from that positioning increases the effective crankshaft torsional stiffness.

To illustrate the space-saving possibilities for a vehicle employing my improved T-drive assembly, I have shown in FIG. 6A a schematic, cross-sectional view of an automotive vehicle of intermediate size (e.g., a Taurus vehicle manufactured by Ford Motor Company) taken along a plane corresponding to the center plane of the vehicle. The existing vehicle profile for the front of the passenger compartment is shown by the character line A. Because of the reduction in the height of the engine used in the T-drive assembly of this invention, it is possible for the designer to lower the vehicle hood line, as indicated by the character line B. Also, the vehicle length may be reduced by the amount shown by dimension "C" in the front bumper area. The upper shaded area in FIG. 6A represents the area of the profile reduction defined by the character lines A and B for the hood and cowl of the vehicle. Furthermore, because of the reduction in the axial length of the T-drive assembly, it is possible to move the T-drive assembly into its optimum position, the latter depending upon the requirements of the particular driveline package for the vehicle.

In the case of the vehicle shown in FIG. 6A, the axial dimensions of my T-drive are such that the rearward extremity of the transmission, which is generally located on the center plane of the vehicle, would intrude into the vehicle passenger compartment a minimal extent comparable to front-wheel drive transaxle assemblies of conventional design now used in the automobile industry. Such intrusion, furthermore, would occur only in the vehicle "tunnel" between the driver and the front seat passenger.

Shown in elevation in FIG. 6A is a schematic view of an existing 3.8 liter six cylinder engine and its disposition in the vehicle engine and transaxle compartment. For purposes of comparison, there is shown a T-drive of the present invention. The outline of the T-drive is shown by the lower shaded area.

Dimension D shows the additional space that is available for crush distance in the event of a front-end vehicle crash. That distance is equal to the increase in the distance from the front of the vehicle to the front of the engine by substituting my T-drive for a conventional 3.8 liter engine and transaxle. Furthermore, an additional space at the rear of the engine is made available by the use of the present T-drive as shown in FIG. 6. That additional space is available to increase the vehicle crush distance even further or to provide additional space for packaging accessories.

FIG. 6A also shows in shaded profile the extent of the intrusion of the transmission gearing housing portion of the T-drive into the passenger compartment. As explained earlier, the gearing housing is located on the center plane of the vehicle. Thus, the transmission gearing housing, in the event of a front-end impact, will tend to enter the tunnel space E between the driver and the front seat passenger rather than intrude into the driver and passenger leg area, as might be the case with a conventional U-drive arrangement of an engine and a transaxle.

Shown in FIG. 6B is a schematic view of the same vehicle shown in FIG. 6A, but the conventional engine and transaxle are shown in full line outline in the crush position following a front-end impact. The corresponding crush position for the T-drive is shown in the shaded profile view. For purposes of comparing the improvement in crush distance with this vehicle application with an unmodified front-end profile, there is shown in dotted phantom outline form the normal engine and transaxle design position before front-end impact. The total crush distance that is available for a conventional installation is shown by dimension F. If the T-drive is substituted in this installation for a conventional 3.8 liter engine and transaxle, the additional crush distance that is made available is shown by dimension G in FIG. 6B. The total crush distance is the sum of dimensions F and G. Dimension H shows the significantly shorter distance a conventional engine would travel in a front-end crash before the transaxle would intrude into the vehicle passenger compartment past the dash intrusion line J.

Having described preferred embodiments of my invention, what I claim and desire to secure by U.S. Letters Patent is:

1. A T-drive vehicle powertrain assembly for an automotive vehicle with front traction wheels comprising an internal combustion engine with a crankshaft mounted transversely with respect to a fore- and -aft centerplane for said vehicle, a drive gear connected to and rotatable in unison with said crankshaft about the axis of the crankshaft at a location intermediate the crankshaft ends;

a power transmission mechanism including multiple ratio gear elements and having a power input shaft connected drivably to said gear elements, said power input shaft being mounted on an axis substantially perpendicular to said crankshaft axis, a power output shaft of said transmission being adapted to be connected to said front vehicle traction wheels;

a driven gear connected drivably to said power input shaft and meshing with said drive gear whereby said engine and said transmission mechanism form a compact, drive assembly;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the driving connection between said power input shaft and said driven gear comprising a hydrokinetic unit having an impeller, a turbine and a housing enclosing said impeller and said turbine, said hydrokinetic unit together with said power input shaft and said gear elements contributing to form an effective rotary inertia mass at said intermediate crankshaft location, said transmission power output shaft extending toward said driven gear; and a final transaxle gear drive located between said engine and said transmission mechanism having differential gearing with axle drive gears, a geared connection between said power output shaft and separate ones of said axle drive gears, each axle drive gear being adapted to be connected drivably to a front traction wheel axle shaft.

2. A T-drive for a front-wheel drive vehicle having an internal combustion engine with a crankshaft having an axis disposed transversely with respect to a fore-and-aft vehicle geometric axis, said vehicle having front drive traction wheels;

a transmission having multiple ratio gearing, a power input shaft connected drivably to torque input portions of said multiple ratio gearing, a power output shaft drivably connected to power output portions of said gearing and adapted to transfer torque to said front drive traction wheels;

cross-axis gearing drivably connecting said crankshaft to said power input portions of said multiple ratio gearing comprising a drive gear connected directly to said crankshaft intermediate its ends and a driven gear engaging said drive gear, said driven gear being drivably connected to said power input shaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the driving connection between said power input shaft and said driven gear comprising a hydrokinetic unit having an impeller, a turbine and a housing enclosing said impeller and said turbine, said hydrokinetic unit together with said power input shaft and said power input portions of said gearing contributing to form an effective rotary inertia mass at said intermediate crankshaft location, said transmission power output shaft extending toward said driven gear; and a final transaxle gear drive located between said engine and said transmission having differential gearing with axle drive gears, a geared connection between said power output shaft and separate ones of said axle drive gears, each axle drive gear being adapted to be connected drivably to an axle shaft for said front traction wheels.

3. A powertrain for a wheeled vehicle with front traction wheels comprising an internal combustion engine and a multiple ratio transmission, said engine and transmission including a common, multiple-part housing, said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crankshaft; a final transaxle gear drive located between said engine and said transmission having differential gearing with axle drive gears, a geared connection between power output portions of said transmission and separate ones of said axle drive gears, each axle drive gear being adapted to be connected drivably to an axle shaft for said front traction wheels;

cross-axis gearing including a bevel drive gear connected to and rotatable with said crankshaft at a position on said crankshaft intermediate its ends, and a bevel driven gear meshing with said bevel drive gear, said bevel driven gear being drivably connected to torque input portions of said transmission and being disposed substantially at a right angle with respect to said crankshaft; and said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the driving connection between said power input portions and said driven gear comprising a hydrokinetic unit having an impeller, a turbine and a housing enclosing said impeller and said turbine, said hydrokinetic unit together with said power input portions of said transmission contributing to form an effective rotary inertia mass at said intermediate crankshaft location.

4. An engine and transmission assembly for a wheeled vehicle with front traction wheels comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission having gearing arranged on a gearing axis generally on said vehicle center plane, said transmission having a housing joined to said cylinder housing to form a unitary T-drive assembly;

a torque input driven gear drivably connected to torque input portions of said transmission, torque output portions of said transmission being adapted to deliver torque to said vehicle front traction wheels;

said torque output portions of said transmission including a torque output shaft extending in a direction generally perpendicular to the axis of said crankshaft;

a final transaxle gear drive located between said engine and said transmission having differential gearing with axle drive gears, a geared connection between said torque output shaft and separate ones of said axle drive gears, each axle drive gear being adapted to be connected drivably to an axle shaft for said front traction wheels;

a crankshaft drive gear connected to said crankshaft intermediate the crankshaft ends directly adjacent one of said bearing portions, said crankshaft drive gear being drivably engaged with said driven gear whereby the overall length of said unitary T-drive assembly is minimized and whereby the height of said engine is lowered relative to the axis of said gearing;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided; and the driving connection between said torque input portions and said driven gear comprising a hydrokinetic unit having an impeller, a turbine and a housing enclosing said impeller and said turbine, said hydrokinetic unit together with said torque input portions of said transmission contributing to form an effective rotary inertia mass at said intermediate crankshaft location.

5. The combination as set forth in claim 4 wherein said transmission includes traction wheel drive torque delivery gearing drivably connected to said final transaxle gear drive and a traction wheel driveshaft extending on an axis spaced from and parallel to said gearing axis whereby said engine and transmission assembly is adaptable for all-wheel drive.

6. A T-drive vehicle powertrain assembly for a front-wheel drive vehicle comprising an internal combustion engine with a crankshaft, a drive gear connected to and rotatable in unison with said crankshaft about the axis of the crankshaft at a location intermediate the crankshaft ends;

a power transmission having a power input shaft mounted on an axis substantially perpendicular to said crankshaft axis and connected to power input portions of said transmission, a power output shaft of said transmission being adapted to be connected to vehicle front traction wheels; and a driven gear connected to said power input shaft and meshing with said drive gear whereby said engine and said transmission mechanism form a compact drive assembly;

said transmission power output shaft extending coaxially through said transmission toward said driven gear;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the driving connection between said power input shaft and said driven gear comprising a rotary hydrokinetic coupling having a coupling drive element, a hydrokinetic coupling driven element and a housing enclosing said coupling elements, said coupling unit together with said power input shaft and said power input portions of said transmission contributing to form an effective rotary inertia mass at said intermediate crankshaft location; and a right angle drive located between said engine and said transmission having a transaxle differential gear unit with two axle drive gears, a geared connection between said power output shaft and said axle drive gears, each axle drive gear being adapted to drive an axle half-shaft for said front traction wheels.

7. The combination as set forth in claim 6 wherein said right angle drive comprises a transaxle differential gear unit with a differential ring gear, a housing for said transmission secured to said engine and enclosing said right angle drive, a torque transfer gear between said ring gear and said power output shaft, said torque transfer gears forming a part of said geared connection whereby said transaxle differential gear unit is located transversely from said power output shaft thereby avoiding interference between said transaxle differential gear unit and said housing whereby the transmission of said powertrain assembly measured in the direction of said power input shaft axis may be reduced.

8. The combination as set forth in claim 6 wherein said T-drive assembly includes traction wheel drive torque delivery gearing drivably connected to said right angle drive and a traction wheel driveshaft extending in an axis spaced from and parallel to said transmission power output shaft.

9. A T-drive for a vehicle having an internal combustion engine with a crankshaft axis disposed transversely with respect to a fore-and-aft vehicle geometric axis, said vehicle having at least one set of traction wheels;

a transmission having multiple ratio gearing, a power input shaft connected drivably to torque input portions of said gearing, a power output shaft drivably connected to power output portions of said gearing and adapted to transfer torque to said traction wheels; and cross-axis gearing drivablY connecting said crankshaft to torque input portions of said multiple ratio gearing, said cross-axis gearing comprising a drive gear connected directly to said crankshaft intermediate its ends and a driven gear engaging said drive gear, said driven gear forming a torque input element of said multiple ratio gearing;

said transmission power output shaft extending coaxially through said multiple ratio gearing toward said driven gear; and a right angle drive located between said engine and said transmission having a transaxle differential gear unit with two axle drive gears, a geared connection between said power output shaft and said axle drive gears, each axle drive gear being adapted to drive an axle half-shaft.

10. The combination as set forth in claim 9 wherein said right angle drive comprises a transaxle differential gear unit with a differential ring gear, a housing for said transmission secured to said engine and enclosing said right angle drive, a torque transfer gear between said ring gear and said power output shaft, said torque transfer gear forming a part of said geared connection whereby said transaxle differential gear unit is located transversely from said power output shaft thereby avoiding interference between said transaxle differential gear unit and said housing whereby the dimension of said T-drive assembly measured in the direction of said geometric axis may be reduced.

11. The combination as set forth in claim 9 wherein said transmission includes traction wheel drive torque delivery gearing connected to said cross-axis gearing and a traction wheel driveshaft extending on an axis spaced from and parallel to said power output shaft whereby said T-drive is adaptable for all-wheel drive.

12. A powertrain for a wheeled vehicle comprising an internal combustion engine and a multiple ratio transmission, said engine and transmission including a common, multiple-part housing, said engine having a crankshaft adapted to be mounted transversely with respect to a fore-and-aft geometric center plane for said vehicle;

cross-axis gearing including a bevel drive gear connected to and rotatable with said crankshaft at a position on said crankshaft intermediate its ends, and a bevel driven gear meshing with said bevel drive gear, said bevel driven gear being connected to torque input portions of said transmission and being disposed substantially at a right angle with respect to said crankshaft;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the connection between said torque input portions and said driven gear comprising a hydrokinetic unit having an impeller, a turbine and a housing enclosing said impeller and said turbine, said hydrokinetic unit together with said torque input portions of said transmission contributing to form an effective rotary inertia mass at said intermediate crankshaft location;

said transmission having a torque output shaft extending coaxially therethrough toward said bevel driven gear;

a right angle drive located between said engine and said transmission having a transaxle differential gear unit with two axle drive gears; and a geared connection between power output portions of said transmission and said axle drive gears, each axle drive gear being adapted to drive one axle half-shaft.

13. The combination as set forth in claim 12 wherein said cross-axis gearing comprises a transaxle differential gear unit with a differential ring gear, a housing for said transmission secured to said engine and enclosing said cross-axis gearing, a torque transfer gear between said ring gear and said power output shaft, said torque transfer gear forming a part of said geared connection whereby said transaxle differential gear unit is located transversely from said power output shaft thereby avoiding interference between said transaxle differential gear unit and said housing whereby the dimension of said powertrain assembly measured in the direction of said power input shaft axis may be reduced.

14. The combination as set forth in claim 12 wherein said powertrain includes a driveshaft for traction wheel torque delivery located on an axis spaced from and parallel to said torque output shaft and wherein said right angle drive includes a geared driving torque flow path between said driveshaft and said transaxle differential gear unit.

15. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission having gearing arranged on a gearing axis generally on said vehicle center plane, said transmission having a housing joined to said cylinder housing to form a unitary T-drive assembly;

a torque input gear connected to torque input portions of said transmission, torque output portions of said transmission being adapted to deliver torque to vehicle traction wheels; and a crankshaft gear connected to said crankshaft intermediate the crankshaft ends directly adjacent one of said bearing portions, said crankshaft gear being drivably engaged with said torque input gear whereby the overall length of said unitary T-drive assembly is minimized and whereby the height of said engine is lowered relative to the axis of said gearing;

said transmission torque output portions including a power output shaft extending coaxially through said gearing toward said crankshaft gear; and a right angle drive located between said engine and said transmission having a transaxle differential gear unit with two axle drive gears, a geared connection between said power output shaft and said axle drive gears, each axle drive gear being adapted to drive an axle half-shaft.

16. The combination as set forth in claim 15 wherein said engine and transmission assembly includes a driveshaft for traction wheel torque delivery located on an axis spaced from and parallel to said power output shaft and wherein said right angle drive includes a geared driving torque flow path between said driveshaft and said transaxle differential gearing.

17. A T-drive vehicle powertrain assembly for a vehicle with front traction wheels comprising an internal combustion engine with a crankshaft, a drive gear connected to and rotatable in unison with said crankshaft about the axis of the crankshaft at a location intermediate the crankshaft ends, a driven gear engaging said drive gear;

said crankshaft having multiple crankshaft bearings including a bearing at each crankshaft end and a bearing near a mid-position on said crankshaft;

a power transmission mechanism having a power input shaft mounted on an axis substantially perpendicular to said crankshaft axis, a power output shaft of said transmission being adapted to be connected to vehicle traction wheels;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

a driving connection between said driven gear and said power input shaft comprising a hydrokinetic unit having an impeller, a turbine and a housing enclosing said impeller and said turbine, said hydrokinetic unit together with said power input shaft contributing to form an effective rotary inertia mass at said intermediate crankshaft location;

said transmission power output shaft extending toward said driven gear; and a final transaxle gear drive located between said engine and said transmission mechanism having differential gearing with axle drive gears, a geared connection between said power output shaft and separate ones of said axle drive gears, each axle drive gear being adapted to be connected drivably to an axle shaft for said front traction wheels; and a driving gear drivably connected to said power input shaft and meshing with said drive gear whereby said engine and said transmission mechanism form a compact drive assembly.

18. A T-drive for a vehicle having an internal combustion engine with a crankshaft axis disposed transversely with respect to a fore-and-aft vehicle geometric axis, said vehicle having at least one set of traction wheels;

a transmission having multiple ratio gearing, a power input shaft connected drivably to torque input portions of said multiple ratio gearing, a power output shaft drivably connected to power output portions of said gearing and adapted to transfer torque to said traction wheels;

said transmission power output shaft extending toward said driven gear; and a final transaxle gear drive located between said engine and said transmission having differential gearing with axle drive gears, a geared connection between said power output shaft and separate ones of said axle drive gears, each axle drive gear being adapted to be connected drivably to an axle shaft; and cross-axis gearing drivably connecting said crankshaft to torque input portions of said multiple ratio gearing, said cross-axis gearing comprising a drive gear connected directly to said crankshaft intermediate its ends and a driven gear engaging said drive gear, said driven gear forming a torque input element of said multiple ratio gearing;

said crankshaft having multiple crankshaft bearings including a bearing at each crankshaft end and a bearing near a mid-position on said crankshaft whereby a near mid-position nodal point is established thus increasing crankshaft torsional stiffness.

19. A powertrain for a wheeled vehicle with front traction wheels comprising an internal combustion engine and a multiple ratio transmission, said engine and transmission including a common, multiple-part housing, said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crankshaft; a final transaxle gear drive located between said engine and said transmission having differential gearing with axle drive gears, a geared connection between power output portions of said transmission and separate ones of said axle drive gears, each axle drive gear being adapted to be connected drivably to an axle shaft;

cross-axis gearing including a bevel drive gear connected to and rotatable with said crankshaft at a position on said crankshaft intermediate its ends, and a bevel driven gear meshing with said bevel drive gear, said bevel driven gear being drivably connected to torque input portions of said transmission and being disposed substantially at a right angle with respect to said crankshaft;

said crankshaft having multiple crankshaft bearings including a bearing at each crankshaft end and a bearing near a mid-position on said crankshaft.

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the driving connection between said torque input portions and said bevel driven gear comprising a hydrokinetic unit having an impeller, a turbine and a housing enclosing said impeller and said turbine, said hydrokinetic unit together with said torque input portions of said transmission contributing to form an effective rotary inertia mass at said intermediate crankshaft location;

20. The combination as set forth in claim 19 wherein said powertrain includes a hydrokinetic unit with an impeller and a turbine in toroidal fluid flow relationship, said impeller being connected to said bevel driven gear whereby said hydrokinetic unit forms a torque delivery path between said bevel driven gear and said torque input portions.

21. The combination as set forth in claim 20 wherein said final transaxle gear drive is disposed between said hydrokinetic unit and said transmission.

22. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission having gearing arranged on a gearing axis generally on said vehicle center plane, said transmission having a housing joined to said cylinder housing to form a unitary T-drive assembly;

a torque input gear drivably connected to torque input portions of said transmission, torque output portions of said transmission being adapted to deliver torque to vehicle traction wheels;

said torque output portions of said transmission including a torque output shaft extending in a direction generally perpendicular to the axis of said crankshaft;

a final transaxle gear drive located between said engine and said transmission having differential gearing with axle drive gears, a geared connection between said torque output portions and separate ones of said axle drive gears, each axle drive gear being adapted to be connected drivably to an axle shaft; and a crankshaft gear connected to said crankshaft intermediate the crankshaft ends directly adjacent one of said bearing portions, said crankshaft gear being drivably engaged with said torque input gear whereby the overall length of said unitary T-drive assembly is minimized and whereby the height of said engine is lowered relative to the axis of said gearing;

said crankshaft having multiple crankshaft bearings including a bearing at each crankshaft end and a bearing near a mid-position on said crankshaft whereby a near mid-position nodal point is established thus increasing crankshaft torsional stiffness.

23. The combination as set forth in claim 22 wherein said transmission includes traction wheel drive torque delivery gearing drivably connected to said cross-axis gearing and a traction wheel driveshaft extending on an axis spaced from and parallel to said gearing axis whereby said engine and transmission assembly is adaptable for all-wheel drive.

24. The combination as set forth in claim 22 wherein said engine and transmission assembly includes a hydrokinetic unit with an impeller and a turbine in toroidal fluid flow relationship, said impeller being connected to said torque input gear and said turbine being connected to said torque input portions thereby establishing a torque transmitting connection between said torque input gear and said torque input portions.

25. The combination as set forth in claim 24 wherein said final transaxle gear drive is disposed between said hydrokinetic unit and said transmission.

26. A T-drive vehicle powertrain assembly for a vehicle with front traction wheels comprising an internal combustion engine with a crankshaft, a drive gear connected to and rotatable in unison with said crankshaft about the axis of the crankshaft at a location intermediate the crankshaft ends;

said crankshaft having multiple crankshaft bearings including a bearing at each crankshaft end and a bearing near a mid-position on said crankshaft;

a power transmission having a power input shaft mounted on an axis substantially perpendicular to said crankshaft axis, a power output shaft of said transmission being adapted to be connected to vehicle traction wheels; and a driven gear connected to said power input shaft and meshing with said drive gear whereby said engine and said transmission mechanism form a compact, unitary drive assembly;

said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the connection between said power input shaft and said driven gear comprising a hydrokinetic unit having an impeller, a turbine and a housing enclosing said impeller and said turbine, said hydrokinetic unit together with said power input shaft and said torque input portions of said transmission contributing to form an effective rotary inertia mass at said intermediate crankshaft location;

said transmission power output shaft extending coaxially through said transmission toward said driven gear; and a right angle drive located between said engine and said transmission having a transaxle differential gear unit with two axle drive gears, a geared connection between said power output shaft and said axle drive gears, each axle drive gear being adapted to drive an axle half-shaft for said front traction wheels.

27. The combination as set forth in claim 26 wherein said right angle drive comprises a transaxle differential gear unit with a differential ring gear, a housing for said transmission secured to said engine and enclosing said right angle drive, a torque transfer gear between said ring gear and said power output shaft, said torque transfer gear forming a part of said geared connection whereby said transaxle differential gear unit is located transversely from said power output shaft thereby avoiding interference between said transaxle differential gear unit and said housing whereby the transmission of said powertrain assembly measured in the direction of said power input shaft axis may be reduced.

28. The combination as set forth in claim 26 wherein said T-drive assembly includes traction wheel drive torque delivery gearing drivably connected to said right angle drive and a traction wheel drive-shaft extending in an axis spaced from and parallel to said transmission power output shaft.

29. A T-drive for a vehicle having internal combustion engine with a crankshaft axis disposed transversely with respect to a fore-and-aft vehicle geometric axis, said vehicle having at least one set of traction wheels;
  a transmission having multiple ratio gearing, a power input shaft connected drivably to torque input portions of said gearing, a power output shaft drivably connected to power output portions of said gearing and adapted to transfer torque to said traction wheels; and
  cross-axis gearing drivably connecting said crankshaft to torque input portions of said multiple ratio gearing, said cross-axis gearing comprising a drive gear connected directly to said crankshaft intermediate its ends and a driven gear engaging said drive gear, said driven gear forming a torque input element of said multiple ratio gearing;
  said crankshaft having multiple crankshaft bearings including a bearing at each crankshaft end and a bearing near a mid-position on said crankshaft whereby a near mid-position nodal point is established thus increasing crankshaft torsional stiffness;
  said transmission power output shaft extending coaxially through said multiple ratio gearing toward said driven gear; and
  a right angle drive located between said engine and said transmission having a transaxle differential gear unit with two axle drive gears, a geared connection between said power output shaft and said axle drive gears, each axle drive gear being adapted to drive an axle half-shaft.

30. The combination as set forth in claim 29 wherein said transmission includes traction wheel drive torque delivery gearing connected to said right angle drive and a traction wheel driveshaft extending on an axis spaced from and parallel to said power output shaft whereby said T-drive is adaptable for all-wheel drive.

31. The combination as set forth in claim 29 wherein said cross-axis gearing comprises a transaxle differential gear unit with a differential ring gear, a housing for said transmission secured to said engine and enclosing said cross-axis gearing, a torque transfer gear between said ring gear and said power output shaft, said torque transfer gear forming a part of said geared connection whereby said transaxle differential gear unit is located transversely from said power output shaft thereby avoiding interference between said transaxle differential gear unit and said housing whereby the dimension of said powertrain assembly measured in the direction of said power input shaft axis may be reduced.

32. A powertrain for a wheeled vehicle comprising an internal combustion engine and a multiple ratio transmission, said engine and transmission including a common, multiple-part housing, said engine having a crankshaft adapted to be mounted transversely with respect to a fore-and-aft geometric center plane for said vehicle;
  cross-axis gearing including a bevel drive gear connected to and rotatable with said crankshaft at a position on said crankshaft intermediate its ends, and a bevel driven gear meshing with said bevel drive gear, said bevel driven gear being connected to torque input portions of said transmission and being disposed substantially at a right angle with respect to said crankshaft;
  said crankshaft having multiple crankshaft bearings including a bearing at each crankshaft end and a bearing near a mid-position on said crankshaft whereby a near mid-position nodal point is established thus increasing crankshaft torsional stiffness;
  said transmission having a torque output shaft extending coaxially therethrough toward said bevel driven gear;
  a right angle drive located between said engine and said transmission having a transaxle differential gear unit with two axle drive gears; and
  a geared connection between power output portions of said transmission and said axle drive gears, each axle drive gear being adapted to drive one axle half-shaft.

33. The combination as set forth in claim 32 wherein said right angle drive comprises a transaxle differential gear unit with a differential ring gear, a housing for said transmission secured to said engine and enclosing said right angle drive a torque transfer gear between said right gear and said power output shaft, said torque transfer gear forming a part of said geared connection whereby said transaxle differential gear unit is located transversely from said power output shaft thereby avoiding interference between said transaxle differential gear unit and said housing whereby the dimension of said powertrain assembly measured in the direction of said torque output shaft may be reduced.

34. The combination as set forth in claim 32 wherein said powertrain includes a driveshaft for traction wheel torque delivery located on an axis spaced from and parallel to said torque output shaft and wherein said right angle drive includes a geared driving torque flow path between said driveshaft and said transaxle differential gear unit.

35. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;
  a transmission having gearing arranged on a gearing axis generally on said vehicle center plane, said transmission having a housing joined to said cylinder housing to form a unitary T-drive assembly;
  a torque input gear connected to torque input portions of said transmission, torque output portions of said transmission being adapted to deliver torque to vehicle traction wheels; and a crankshaft gear connected to said crankshaft intermediate the crankshaft ends directly adjacent one of said bearing portions, said crankshaft gear being drivably engaged with said torque input gear whereby the overall length of said unitary T-drive assembly is minimized and whereby the height of said engine is lowered relative to the axis of said gearing;

said crankshaft having multiple crankshaft bearings including a bearing at each crankshaft end and a bearing near a mid-position on said crankshaft whereby a near mid-position nodal point is established thus increasing crankshaft torsional stiffness;

said transmission torque output portions including a power output shaft extending coaxially through said gearing toward said crankshaft gear; and a right angle drive located between said engine and said transmission having a transaxle differential gear unit with two axle drive gears, a geared connection between said power output shaft and said axle drive gears, each axle drive gear being adapted to drive an axle half-shaft.

36. The combination as set forth in claim 35 wherein said engine and transmission assembly includes a driveshaft for traction wheel torque delivery located on an axis spaced from and parallel to said torque output shaft and wherein said right angle drive includes a geared driving torque flow path between said driveshaft and said transaxle differential gear unit.

37. A T-drive vehicle powertrain assembly comprising an internal combustion engine with a crankshaft, a drive gear connected to and rotatable in unison with said crankshaft about the axis of the crankshaft at a location intermediate the crankshaft ends;

a power transmission mechanism having a power input shaft mounted on an axis substantially perpendicular to said crankshaft axis, a power output shaft of said transmission being adapted to be connected to vehicle traction wheels;

a driving gear meshing with said drive gear; said transmission power output shaft extending toward said driving gear;

a final transaxle gear drive located between said engine and said transmission mechanism having differential gearing with axle drive gears, a geared connection between said power output shaft and separate ones of said axle drive gears, each axle drive gear being adapted to be connected drivably to an axle shaft; and a hydrokinetic unit having a turbine and an impeller in toroidal fluid flow relationship, said driving gear being connected to said impeller and said turbine being connected to said power input shaft whereby said driving gear is drivably connected to said power input shaft, said engine and said transmission mechanism from a compact, unitary drive assembly.

38. The combination as set forth in claim 37 wherein said final transaxle gear drive is disposed between said hydrokinetic unit and said transmission mechanism.

39. A T-drive for a vehicle having an internal combustion engine with a crankshaft axis disposed transversely with respect to a fore-and-aft vehicle geometric axis, said vehicle having at least one set of traction wheels;

a transmission having multiple ratio gearing, a power input shaft connected drivably to torque input portions of said multiple ratio gearing, a power output shaft drivably connected to power output portions of said gearing and adapted to transfer torque to said traction wheels;

cross-axis gearing drivably connecting said crankshaft to said torque input portions of said multiple ratio gearing comprising a drive gear connected directly to said crankshaft intermediate its ends and a driven gear engaging said drive gear, said driven gear being drivably connected to said power input shaft;

said transmission power output shaft extending toward said driven gear; and a final transaxle gear drive located between said engine and said transmission having differential gearing with axle drive gears, a geared connection between said power output shaft and separate ones of said axle drive gears, each axle drive gear being adapted to be connected drivably to an axle shaft; and a hydrokinetic unit having a turbine and an impeller in toroidal fluid flow relationship, said driving gear being connected to said impeller and said turbine being connected to said power input shaft whereby said driven gear is adapted to transfer torque through said hydrokinetic unit to torque input elements of said multiple ratio gearing.

40. The combination as set forth in claim 39 wherein said final transaxle gear drive is disposed between said hydrokinetic unit and said transmission.

41. A powertrain for a wheeled vehicle comprising an internal combustion engine and a multiple ratio transmission, said engine and transmission including a common, multiple-part housing, said engine having a crankshaft adapted to be mounted transversely with respect to a fore-and-aft geometric center plane for said vehicle;

said transmission having a power output shaft extending toward said crankshaft in a substantially perpendicular direction with respect to the axis of said crankshaft; a final transaxle gear drive located between said engine and said transmission having differential gearing with axle drive gears, a geared connection between power output portions of said transmission and separate ones of said axle drive gears, each axle drive gear being adapted to be connected drivably to an axle shaft;

cross-axis gearing including a bevel drive gear connected to and rotatable with said crankshaft at a position on said crankshaft intermediate its ends, and a bevel driven gear meshing with said bevel drive gear, said bevel driven gear being drivably connected to torque input portions of said transmission and being disposed substantially at a right angle with respect to said crankshaft; and a hydrokinetic unit having a turbine and an impeller in toroidal fluid flow relationship, said impeller being connected to said bevel driven gear and said turbine being connected to torque input portions of said transmission whereby said hydrokinetic unit forms a torque flow connection between said bevel drive gear and said torque input portions of said transmission, said bevel driven gear being disposed on an axis substantially at a right angle with respect to said crankshaft.

42. The combination as set forth in claim 41 wherein said final transaxle gear drive is located between said hydrokinetic unit and said transmission.

43. An engine and transmission assembly for a wheeled vehicle comprising an internal combustion engine with a cylinder housing and a crankshaft having multiple crank portions and multiple bearing portions adjacent the crank portions for journalling said crankshaft for rotation about an axis transverse to a fore-and-aft center plane for said vehicle;

a transmission having gearing arranged on a gearing axis generally on said vehicle center plane, said transmission having a housing joined to said cylinder housing to form a unitary T-drive assembly;

a torque input gear drivably connected to torque input portions of said transmission, torque output portions of said transmission being adapted to deliver torque to vehicle traction wheels;

said torque output portions of said transmission including a torque output shaft extending in a direction generally perpendicular to the axis of said crankshaft;

a final transaxle gear drive located between said engine and said transmission having differential gearing with axle drive gears, a geared connection between said torque output shaft and separate ones of said axle drive gears, each axle drive gear being adapted to be connected drivably to an axle shaft; and a crankshaft gear connected to said crankshaft intermediate the crankshaft ends directly adjacent one of said bearing portions, said crankshaft gear being drivably engaged with said torque input gear whereby the overall length of said unitary T-drive assembly is minimized and whereby the height of said engine is lowered relative to the axis of said gearing;

a hydrokinetic unit comprising an impeller connected to said crankshaft gear and a turbine connected to said torque input portions, said impeller and said turbine being in toroidal fluid flow relationship thereby defining a torque delivery path from said torque input gear to said torque input portions.

44. The combination as set forth in claim 43 wherein said final transaxle gear drive is disposed between said hydrokinetic unit and said transmission.

* * * * *

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

| | | |
|---|---|---|
| Column 3, | Line 33, | Before "comparable" delete --in--. |
| Column 5, | Line 36, | After "gears" insert --associated--. |
| Column 6, | Line 23, | After "16" insert --It functions as a hydrokinetic coupling between the engine and the transmission gearing--. |
| Column 8, | Line 42, | After "reaction" delete "meter" and insert --member--. |
| Column 10, | Lines 60-61, | After "and" (second occurrence) delete "A" and insert --A'--. |
| Column 12, | Line 47, | Delete "for" and insert --or--. |
| Column 13, | Line 37, | Before "embodiment" delete "figure 1a". |
| Column 15, Claim 1 | Line 31, | Delete space between hyphen, should be: "fore-and-aft". |
| Column 15, Claim 1 | Line 47, | Delete "," (comma). |
| Column 16, Claim 2 | Line 14, | Delete "torque" and insert --power--. |

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

| | | |
|---|---|---|
| Column 17, Claim 3 | Line 10, | Delete "torque" and insert --power--. |
| Column 19, Claim 11 | Line 65, | Delete "cross-axis gearing" and insert --right angle drive--. |
| Column 20, Claim 12 | Line 1, | Between "vehicle" and "comprising" insert --with front traction wheels--. |
| Column 20, Claim 12 | Line 43, | After "half-shaft" insert --for said front traction wheels--. |
| Column 20, Claim 13 | Line 46, | Delete "cross-axis gearing" and insert --right angle drive--. |
| Column 20, Claim 13 | Line 56, | Delete "power input shaft axis" and insert --geometric center plane--. |
| Column 20, Claim 15 | Line 65, | After "vehicle" insert --with front traction wheels--. |
| Column 21, Claim 15 | Line 7, | After "input" insert --driven--. |
| Column 21, Claim 15 | Line 14, | Delete "torque input" and insert --driven--. |

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

Column 21, Line 11, Claim 15           "After "crankshaft" insert --drive--.

Column 21, Line 23, Claim 15           After "crankshaft gear;" insert the following two subparagraphs:

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;
a driving connection between said driven gear and said torque input portions comprising a rotary hydrokinetic coupling having a coupling driving element, a hydrokinetic coupling driven element and a housing enclosing said coupling elements, said coupling together with said torque input gear and said torque input portions of said transmission contributing to form an effective rotary inertia mass at said intermediate crankshaft location;--.

Column 21, Line 27, Claim 15           After "half-shaft" insert --for said front traction wheels--.

Column 22, Line 15, Claim 18           After "crankshaft" insert --having an--.

UNITED STATES PATENT AND TRADEMARK OFFICE
CERTIFICATE OF CORRECTION

PATENT NO. : 5,125,284

DATED : June 30, 1992

INVENTOR(S) : Donald L. Carriere

It is certified that error appears in the above-identified patent and that said Letters Patent is hereby corrected as shown below:

| | | |
|---|---|---|
| Column 22, Claim 18 | Line 17, | After "having" delete "at least one set of" and insert --front--. |
| Column 22, Claim 18 | Line 26, | After "said" delete "driven gear and" and insert --crankshaft axis--. |
| Column 22, Claim 18 | Line 32, | After "shaft" and before ";" insert --for said front traction wheels--. |
| Column 22, Claim 18 | Line 39, | Delete "forming a" and insert --being connected to said torque--. |
| Column 22, Claim 18 | Line 40, | Delete "element" and insert --portions--. |
| Column 22, Claim 18 | Line 41, | After "ratio gearing;" insert the following two subparagraphs: |

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

UNITED STATES PATENT AND TRADEMARK OFFICE
CERTIFICATE OF CORRECTION

PATENT NO.   :   5,125,284
DATED        :   June 30, 1992
INVENTOR(S)  :   Donald L. Carriere It is certified that error appears in the above-identified patent and that said Letters Patent is hereby corrected as shown below:

Column 22, Line 41,     (continued from previous page)

the driving connection between said torque input portions and said driven gear comprising a hydrokinetic unit having an impeller, a turbine and a housing enclosing said impeller and said turbine, said hydrokinetic unit together with said power input shaft and said torque input portions of said transmission contributing to form an effective rotary inertia mass at said intermediate crankshaft location;--

Column 22, Line 44, Claim 18     Delete "whereby a near mid-position nodal point is established thus increasing crankshaft torsional stiffness".

Column 23, Line 3, Claim 19     Delete "said crankshaft having multiple crankshaft bearings including a bearing at each crankshaft end and a bearing near a mid-position on said crankshaft.".

Column 23, Line 24, Claim 19     After "location;" insert new paragraph --said crankshaft having multiple crankshaft bearings including a bearing at each crankshaft end and a bearing near a mid-position on said crankshaft.--

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

| | | |
|---|---|---|
| Column 23, Claim 20 | Line 26, | After "said" delete "powertrain includes a hydrokinetic unit with an impeller and a turbine in toroidal fluid flow relationship, said". |
| Column 23, Claim 20 | Line 28, | After "impeller" delete "being" and insert --is--. |
| Column 23, Claim 22 | Line 36, | After "vehicle" insert --with front traction wheels--. |
| Column 23, Claim 22 | Line 45, | After "input" insert --driven--. |
| Column 23, Claim 22 | Line 60, | Delete "and". |
| Column 23, Claim 22 | Line 61, | After "crankshaft" (first occurrence) insert --drive--. |
| Column 24, Claim 22 | Line 1, | After "gearing;" insert the following two subparagraphs: |

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

Column 24, Line 1, (continued from previous page)

larger than the radial extent of the path of movement of said one crank portion whereby interference between said driven gear and said one crank portion is avoided;
    the driving connection between said torque input portions and said driven gear comprising a hydrokinetic unit having an impeller, a turbine and a housing enclosing said impeller and said turbine, said hydrokinetic unit together with said torque input portions of said transmission contributing to form an effective rotary inertia mass at said intermediate crankshaft location;--

Column 24, Lines 4-5, Delete "whereby a near
Claim 22 mid-position nodal point is established thus increasing crankshaft torsional stiffness".

Column 24, Lines 8-9, Delete "cross-axis gearing" and
Claim 23 insert --final transaxle gear drive--.

Column 24, Lines 14-16, Delete "engine and transmission
Claim 24 assembly includes a hydrokinetic unit with an impeller and a turbine in toroidal fluid flow relationship, said".

Column 24, Line 16, Delete "being" and insert --is--.
Claim 24

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

| | | |
|---|---|---|
| Column 24, Claim 24 | Line 17, | Delete "being" and insert --is--. |
| Column 24, Claim 24 | Line 20, | After "input" insert --driven--. |
| Column 24, Claim 26 | Line 59, | "contritubing" should be --contributing--. |
| Column 25, Claim 27 | Line 13, | "transmission" should be --dimension--. |
| Column 25, Claim 27 | Line 15, | Delete "power input shaft" and insert --geometric--. |
| Column 25, Claim 29 | Line 23, | After "crankshaft" insert --having an--. |
| Column 25, Claim 29 | Line 25, | Delete "at least one set of" and insert --front--. |
| Column 25, Claim 29 | Line 29, | Delete "connected to" and insert --connecting--. |
| Column 25, Claim 29 | Line 30, | After "said" insert --front--. |
| Column 25, Claim 29 | Line 36, | Delete "forming" and insert --being connected to--. |

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

| | | |
|---|---|---|
| Column 25, Claim 29 | Line 42, | Delete "whereby a near mid-position nodal point is established thus increasing crankshaft torsional stiffness;" |
| Column 25, Claim 29 | Line 44, | Insert the following two subparagraphs: |

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;
the connection between said torque input elements and said driven gear comprising a hydrokinetic unit having an impeller, a turbine and a housing enclosing said impeller and said turbine, said hydrokinetic unit together with said power input shaft and said torque input portions of said transmission contributing to form an effective rotary inertia mass at said intermediate crankshaft location;--

| | | |
|---|---|---|
| Column 25, Claim 29 | Line 52, | After "half-shaft" insert --for said front traction wheels--. |

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

| | | |
|---|---|---|
| Column 25, Claim 31 | Line 60, | "cross-axis gearing" should be --right angle drive--. |
| Column 25, Claim 31 | Line 63, | "cross-axis gearing" should be --right angle drive--. |
| Column 25, Claim 31 | Line 65, | "gear" should be "gears". |
| Column 26, Claim 31 | Line 1, | "dimension" should be --transmission--. |
| Column 26, Claim 32 | Line 5, | After "vehicle" insert --with front traction wheels--. |
| Column 26, Claim 32 | Line 7, | "said engine" should begin a new paragraph. |
| Column 26, Claim 32 | Lines 21-22, | Delete "whereby a near mid-position nodal point is established thus increasing crankshaft torsional stiffness". |
| Column 26, Claim 32 | Line 23, | Insert the following two subparagraphs: |

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft

UNITED STATES PATENT AND TRADEMARK OFFICE
CERTIFICATE OF CORRECTION

PATENT NO. : 5,125,284

DATED : June 30, 1992

INVENTOR(S) : Donald L. Carriere

It is certified that error appears in the above-identified patent and that said Letters Patent is hereby corrected as shown below:

Column 26, Line 23, (continued from previous page)

axis, the pitch diameter of said drive gear being larger than the radial extent of the path of movement of said one crank portion whereby interference between said driven gear and said one crank portion is avoided;
    the connection between said bevel driven gear and said torque input portions comprising a hydrokinetic unit having an impeller, a turbine and a housing enclosing said impeller and said turbine, said hydrokinetic unit together with said torque input portions contributing to form an effective rotary inertia mass at said intermediate crankshaft location;--.

| | | |
|---|---|---|
| Column 26, Claim 32 | Line 33, | After "half-shaft" insert --for said front traction wheels--. |
| Column 26, Claim 33 | Line 48, | After "drive" insert --,--. |
| Column 26, Claim 35 | Line 38, | After "vehicle" insert --having front traction wheels--. |
| Column 26, Claim 35 | Line 65, | After "input" insert --driven--. |
| Column 27, Claim 35 | Line 1, | After "crankshaft" insert --drive--.(1st. occurrence) |

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

Column 27, Line 4, Claim 35     After "input" insert --driven--.

Column 27, Line 12, Claim 35     Delete "whereby a near mid-position nodal point is established thus increasing crankshaft torsional stiffness".

Column 27, Line 13, Claim 35     Insert the following two subparagraphs:

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;

the connection between said driven gear and said torque input portions of said transmission comprising a hydrokinetic unit having an impeller, a turbine and a housing enclosing said impeller and said turbine, said hydrokinetic unit together with said torque input portions contributing to form an effective rotary inertia mass at said intermediate crankshaft location;--.

UNITED STATES PATENT AND TRADEMARK OFFICE
CERTIFICATE OF CORRECTION

PATENT NO. : 5,125,284

DATED : June 30, 1992

INVENTOR(S) : Donald L. Carriere

It is certified that error appears in the above-indentified patent and that said Letters Patent is hereby corrected as shown below:

| | | |
|---|---|---|
| Column 27, Claim 35 | Line 16, | After "crankshaft" insert --drive--. |
| Column 27, Claim 35 | Line 22, | After "half-shaft" insert --for said front traction wheels--. |
| Column 27, Claim 37 | Line 30, | After "assembly" insert --for a vehicle with front traction wheels--. |
| Column 27, Claim 37 | Line 39, | After "to" insert --said front--. |
| Column 27, Claim 37 | Line 40, | "driving" should be --driven--. |
| Column 27, Claim 37 | Line 42, | "driving" should be --driven--. |
| Column 27, Claim 37 | Line 56, | Delete ", unitary". |
| Column 27, Claim 37 | Line 56-57, | After "assembly" insert the following two subparagraphs: |

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being

UNITED STATES PATENT AND TRADEMARK OFFICE
CERTIFICATE OF CORRECTION

PATENT NO. : 5,125,284

DATED : June 30, 1992

INVENTOR(S) : Donald L. Carriere

It is certified that error appears in the above-identified patent and that said Letters Patent is hereby corrected as shown below:

Column 27, Lines 56-57, (continued from previous page)
Claim 37 larger than the radial extent of the path of movement of said one crank portion whereby interference between said driven gear and said one crank portion is avoided;
    said hydrokinetic unit defining in part an effective rotary inertia mass at said intermediate crankshaft location.--.

Column 27, Line 61,     After "vehicle" insert --with front traction wheels--.
Claim 39

UNITED STATES PATENT AND TRADEMARK OFFICE
CERTIFICATE OF CORRECTION

PATENT NO. : 5,125,284

DATED : June 30, 1992

INVENTOR(S) : Donald L. Carriere

It is certified that error appears in the above-identified patent and that said Letters Patent is hereby corrected as shown below:

Column 28, Line 27,     After "gearing" insert the
Claim 39     following two subparagraphs:

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;
    said hydrokinetic unit defining in part an effective rotary inertia mass at said intermediate crankshaft location.--.

Column 28, Line 31,     After "vehicle" insert --having
Claim 41     front traction wheels--.

Column 29, Line 2,     After "vehicle" insert --with
Claim 43     front traction wheels--.

Column 29, Line 12,     After "input" insert --driven--.
Claim 43

Column 30, Line 5,     After "crankshaft" insert
Claim 43     --drive--.

Column 30, Line 8,     After "input" insert --driven--.
Claim 43

UNITED STATES PATENT AND TRADEMARK OFFICE
CERTIFICATE OF CORRECTION

PATENT NO. : 5,125,284
DATED : June 30, 1992
INVENTOR(S) : Donald L. Carriere

It is certified that error appears in the above-identified patent and that said Letters Patent is hereby corrected as shown below:

Column 30, Line 19,    After "portions" insert the
Claim 43,              following two subparagraphs:

--said crankshaft having multiple crank portions, said drive gear being mounted on one axial side of one of said crank portions, said driven gear being mounted for rotation in the plane of motion of said one crank portion with its axis of rotation transversely disposed with respect to said crankshaft axis, the pitch diameter of said drive gear being larger than the radial extent of the path of movement of said one crank portion whereby interference between said driven gear and said one crank portion is avoided;
said hydrokinetic unit defining in part an effective rotary inertia mass at said intermediate crankshaft location.--.

Signed and Sealed this

Twenty-fourth Day of January, 1995

Attest:

BRUCE LEHMAN

*Attesting Officer*    *Commissioner of Patents and Trademarks*